United States Patent
Salunke et al.

(10) Patent No.: US 10,198,339 B2
(45) Date of Patent: Feb. 5, 2019

(54) CORRELATION-BASED ANALYTIC FOR TIME-SERIES DATA

(71) Applicant: Oracle International Corporation, Redwood Shores, CA (US)

(72) Inventors: Sampanna Salunke, San Carlos, CA (US); Dustin Garvey, Oakland, CA (US); Uri Shaft, Fremont, CA (US); Lik Wong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 142 days.

(21) Appl. No.: 15/155,486

(22) Filed: May 16, 2016

(65) Prior Publication Data

US 2017/0329660 A1     Nov. 16, 2017

(51) Int. Cl.
*G06F 11/00*     (2006.01)
*G06F 11/34*     (2006.01)
*G06F 11/07*     (2006.01)

(52) U.S. Cl.
CPC ............ *G06F 11/34* (2013.01); *G06F 11/079* (2013.01); *G06F 11/3409* (2013.01)

(58) Field of Classification Search
CPC .............. G06F 11/079; G06F 11/0706; G06F 11/0751; G06F 11/3409
See application file for complete search history.

(56) References Cited

U.S. PATENT DOCUMENTS

| | | | | |
|---|---|---|---|---|
| 6,643,613 B2 * | 11/2003 | McGee | ............... | G06F 11/0709 700/51 |
| 6,996,599 B1 * | 2/2006 | Anders | ..................... | G06F 8/61 707/E17.032 |
| 7,343,375 B1 * | 3/2008 | Dulac | ............... | G06F 17/30702 707/694 |
| 7,739,143 B1 * | 6/2010 | Dwarakanath | ..... | G06Q 30/0202 705/7.31 |
| 7,783,510 B1 | 8/2010 | Gilgur et al. | | |
| 7,987,106 B1 | 7/2011 | Aykin | | |
| 8,200,454 B2 | 6/2012 | Dorneich et al. | | |
| 8,234,236 B2 | 7/2012 | Beaty et al. | | |

(Continued)

OTHER PUBLICATIONS

Haugen et al., "Extracting Common Time Trends from Concurrent Time Series: Maximum Autocorrelation Factors with Applications", Stanford University, Oct. 20, 2015, pp. 1-38.

*Primary Examiner* — Philip Guyton
(74) *Attorney, Agent, or Firm* — Invoke

(57) ABSTRACT

Techniques are described for modeling variations in correlation to facilitate analytic operations. In one or more embodiments, at least one computing device receives first metric data that tracks a first metric for a first target resource and second metric data that tracks a second metric for a second target resource. In response to receiving the first metric data and the second metric data, the at least one computing device generates a time-series of correlation values that tracks correlation between the first metric and the second metric over time. Based at least in part on the time-series of correlation data, an expected correlation is determined and compared to an observed correlation. If the observed correlation falls outside of a threshold range or otherwise does not satisfy the expected correlation, then an alert and/or other output may be generated.

22 Claims, 23 Drawing Sheets

(56) References Cited

U.S. PATENT DOCUMENTS

| | | | |
|---|---|---|---|
| 8,635,328 B2* | 1/2014 | Corley | H04L 43/16 709/224 |
| 8,694,969 B2 | 4/2014 | Bernardini et al. | |
| 8,930,757 B2* | 1/2015 | Nakagawa | G06F 11/3452 702/185 |
| 9,323,599 B1* | 4/2016 | Iyer | G06F 11/0751 |
| 9,355,357 B2 | 5/2016 | Hao et al. | |
| 9,367,382 B2* | 6/2016 | Yabuki | G06F 11/079 |
| 9,389,946 B2* | 7/2016 | Higuchi | G06F 11/34 |
| 9,658,916 B2* | 5/2017 | Yoshinaga | G06F 11/079 |
| 2002/0019860 A1* | 2/2002 | Lee | G06Q 10/10 709/220 |
| 2002/0092004 A1* | 7/2002 | Lee | G06F 8/00 717/140 |
| 2005/0193281 A1* | 9/2005 | Ide | G06F 11/0709 714/4.1 |
| 2010/0050023 A1* | 2/2010 | Scarpelli | G06F 11/0709 714/46 |
| 2012/0278663 A1* | 11/2012 | Hasegawa | G06F 11/0709 714/47.1 |
| 2013/0326202 A1 | 12/2013 | Rosenthal et al. | |
| 2015/0046123 A1* | 2/2015 | Kato | G06F 11/079 702/183 |
| 2015/0248446 A1 | 9/2015 | Nordstrom et al. | |
| 2016/0378809 A1* | 12/2016 | Chen | G06F 17/30477 707/755 |
| 2017/0329660 A1* | 11/2017 | Salunke | G06F 11/079 |
| 2017/0351563 A1* | 12/2017 | Miki | G06F 11/0751 |

* cited by examiner

CORRELATION-BASED ANALYTIC FOR TIME-SERIES DATA

TECHNICAL FIELD

The present disclosure relates to facilitating root cause analysis in software telemetry. In particular, the present disclosure relates to modeling correlation between different metrics to analyze system performance.

BACKGROUND

Software telemetry involves the collection of various metrics that may be useful to analyze performance degradation within a software system. For example, metrics that identify processor usage, memory bandwidth, input/output (I/O) operations, and other resource utilization rates may be indicative of an underlying root cause of performance degradation. In many organizations, administrators are responsible for analyzing various metrics to determine which software or hardware components, if any, are contributing to degradation. However, the root cause of the problem may not always be readily apparent from the raw metric data.

In some cases, an administrator may leverage root cause analytical models to help address performance degradation in complex systems. One example approach is described in U.S. Pat. No. 8,612,377, which is incorporated by reference herein as if set forth in its entirety. According to this approach, an aggregate analytic model is built by linking a plurality of diagnostic models based on the topology of the system. One deficiency of this approach is that the aggregate model is tightly coupled to the underlying topology of the system being analyzed—any changes in the topology of the system would also result in a change in the aggregate model. In addition, the aggregate analytic model relies on an inferred system state to produce diagnostic information. If there are unknown variables and states within a system, then the accuracy of what is being inferred may be unstable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
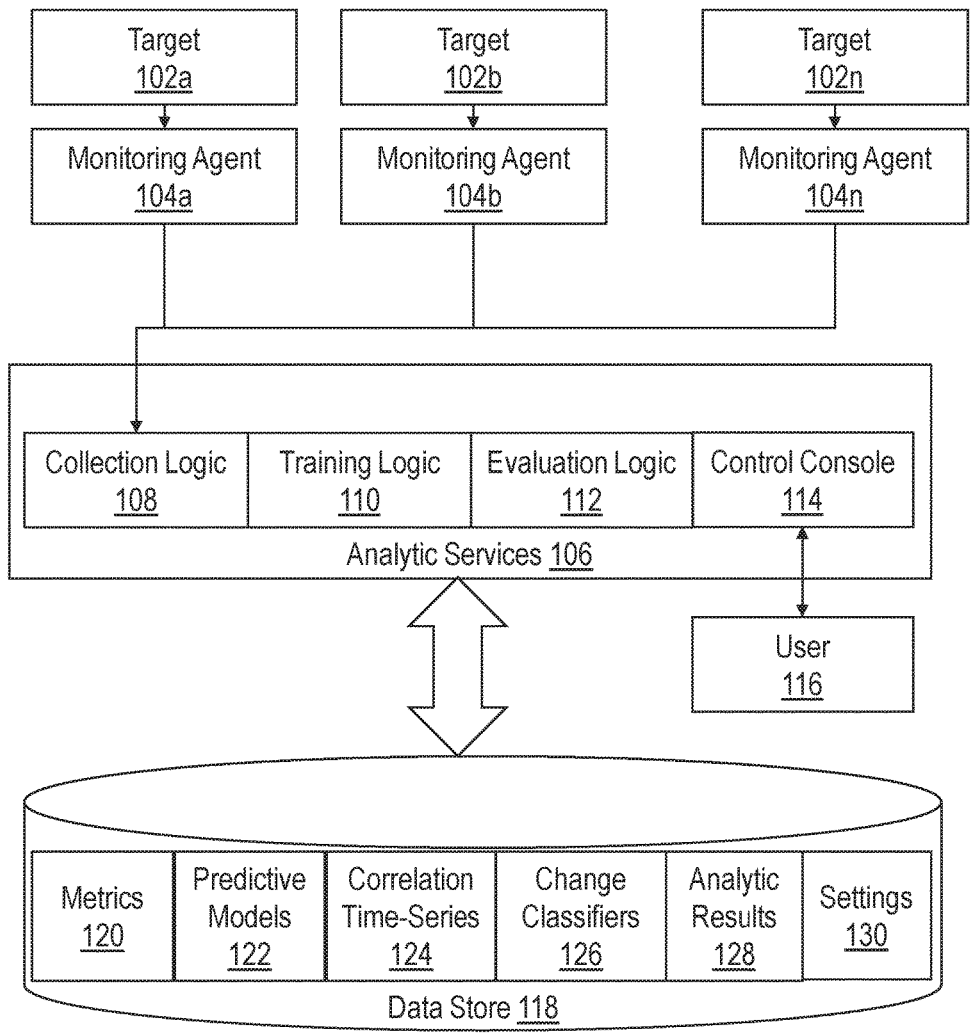
FIG. 1 illustrates a system for monitoring and analyzing a set of time series data in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. ANALYTIC FOR FACILITATING ROOT CAUSE ANALYSIS

4. ANALYTIC MODEL SETUP
5. ANALYTIC MODEL TRAINING
6. CORRELATION PREDICTION MODELS
7. CHANGE CLASSIFICATION MODELS
8. GROUP ANALYSIS MODELS
9. COMBINED EVALUATIONS OF METRIC DATA
10. TOPOLOGY-AWARE ANALYTICS
11. ANALYTIC RESULT GENERATION
12. HARDWARE OVERVIEW
13. MISCELLANEOUS; EXTENSIONS

1. General Overview

Traditionally, the responsibility of addressing degraded performance within software systems has fallen on system administrators. When a problem is encountered, the system administrator, based on a working knowledge of the system, identifies which software or hardware components are the likely cause of the problem. As part of the analysis, the administrator may examine different metrics associated with each component in order to narrow down and isolate the likely cause of the problem. Identifying metrics of interest may help guide the administrator to run a set of test operations until the root cause of the problem is discovered.

In complex systems, the number of potential failure points may lead to an overwhelming number of components and metrics to analyze should degradation occur. While automated monitoring tools may help system administrators examine multiple metrics across different target resources, they often give little or no indication about which metrics may be of interest. The system administrator is then left with a potentially complex and time-intensive task of sifting through various metrics in an attempt to isolate which metrics are relevant to the problem at hand.

During analysis, it is often useful for system administrators to learn or otherwise identify relationships between metrics. One approach is to use state-driven regression models, such as Linear Regression and Auto-Associative Kernel Regression (AAKR). These regression models employ a supervised-learning approach, whereby training the models involves receiving input from the administrator or some other external user. For instance, the administrator may be responsible for identifying relevant situations, removing irrelevant or uncorrelated data from the training set, and inputting other training parameters. Once the state-driven regression model is trained, it may be used to produce estimates of future metric values based on relationships that have been learned from the training set of data. If a predicted metric value is different than an observed metric value at a particular point in time, then the state-driven regression model may generate a flag to notify the system administrator.

One deficiency with state-driven regression models is that seasonal context is not factored in when producing estimates. As a result, these models may produce inaccurate predictions of future metric values, potentially leading to metrics of interest being overlooked or irrelevant metrics being flagged. For example, one scenario that may occur when a system administrator is analyzing resource usage within a complex software system is that an observed load may be unseasonably high for a weekend. If the system administrator is trying to identify such anomalies, a state-driven regression model may classify the resource usage as normal even though the usage pattern is abnormally high for a weekend. This "normal" classification may occur as a result of the state-driven regression model not accounting for differences between metric values on weekdays and metric values on weekends when formulating a prediction.

Another deficiency with state-driven regression models is that such models are tailored to producing estimates on future magnitude values for the metrics of interest. As such, state-driven regression models are likely to flag anomalies if there are changes in the values of the metrics observed even if the relationship between metrics has not changed significantly. In many scenarios, a change in the magnitude of a particular metric may not be interesting or unexpected when analyzed in relation to other metrics. For instance, a metric identifying higher central processing unit (CPU) utilization than usual may be considered normal if other related metrics rise at the same time. A state-driven regression model may flag such high CPU utilization as an anomaly, even though it may not be unexpected or useful in helping an administrator solve the root cause of a problem.

Another deficiency with state-driven regression models is that the technique involves supervised training. In other words, a human user such as a developer or system administrator is responsible for guiding the learning process of the model to ensure correct training. This may include identifying the specific metrics that are input into the model including the metric sample times to use when training the model, filtering out metrics that are deemed uncorrelated or otherwise unrelated, and feeding other training parameters into the model. Such a supervised approach is difficult to scale to systems that operate in large and complex environments.

Systems and methods are described herein through which temporal variation in correlations between related metrics is automatically determined and modeled. In contrast to state-driven regression models, the analytical training described herein may employ an unsupervised learning approach through which correlation may be modeled without reliance on a human user to guide the training process. In addition, the predictive correlation models are trained to learn correlation patterns between different time-series over time. This allows the predictive correlation model to be used to generate analytic outputs, such as flagging anomalies, raising alerts, and/or diagnosing problems or other events, based on a comparison between a predicted correlation and an observed correlation.

The predictive correlation models described herein further allow for monitoring and analytic systems to learn the relationship between metrics independent of the absolute values of the metrics. In order to learn the relationships, the predictive correlation model builds a time-series of correlation values that track the correlation of different metrics over time. Based on the correlation time-series, the predictive correlation model may produce future estimates on the correlation between different metrics. An analysis on the correlation between different metrics may then be performed independent of the magnitude of those metrics. For example, a metric may have an abnormally high value if compared to its own historical data. However, if considered in relation to other metrics, a normal correlation may be detected. The predicted correlation compared to the observed correlation may serve as one of one or more factors when determining whether or not to raise an alert or generate some other analytic output.

The predictive correlation models further allow for monitoring and analytic systems to automatically detect the absence of correlation between two metrics. Thus, the models may be used to detect scenarios where historically uncorrelated metrics unexpectedly become correlated or previously correlated metrics become unexpectedly uncorrelated. Either of these scenarios may indicate that the two metrics are related to the root cause of a potential system problem.

The predictive correlation models may account for trends and/or seasonality in the correlation between different metrics. Since the correlation is calculated as a time-series, a triple exponential function such as Additive Holt Winters may be applied to extract level, trend, and seasonal components. These components may be used to automatically learn high periods and low periods of correlation from historical metric data. In the context of resource load monitoring, for example, two metrics may exhibit little to no correlation at low loads since values in the metrics may be a function of noise. However, as the load increases, then the correlation between metrics may increase. By learning and modeling this behavior, an analytical model may raise a flag if high correlation is observed at low load periods or low correlation is observed at high load periods.

In one or more embodiments, a correlation prediction model is generated from a set of metric data that tracks a plurality of metrics across different target resources. The metric data may include first metric data that tracks a first performance metric for a first target resource and second metric data that tracks a second performance metric for a second target resource. In response to receiving the first metric data and the second metric data by at least one computing device, the at least one computing device generates, within volatile and/or non-volatile storage based at least in part on the first metric data and the second metric data, a time-series of correlation values that tracks correlation between the first performance metric and the second performance metric over time. The at least one computing device determines, based at least in part on the time-series of correlation data, an expected correlation between the first performance metric and the second performance metric for a particular period of time and compares the expected correlation to an observed correlation between the first performance metric and the second performance metric. Based on the comparison, the at least one computing device determines whether the observed correlation satisfies the expected correlation. If the observed correlation falls outside of a threshold range or otherwise does not satisfy the expected correlation, then the at least one computing device generates an output to indicate that the observed correlation between the first performance metric and the second performance metric does not satisfy the expected correlation between the first performance and the second performance metric.

The correlation prediction models described herein may be integrated into monitoring and analytic systems that track a set of performance metrics across a plurality of target resources. In the context of information technology systems, for instance, the correlation prediction models may be integrated into enterprise management systems that track performance metrics for a variety of hardware and/or software resources deployed within a datacenter or cloud environment. The correlation prediction models may be trained from and evaluated against the performance metrics to generate a set of analytic results that facilitate identification of the root cause of performance degradation within the environment.

2. Architectural Overview

FIG. 1 illustrates a system for monitoring and analyzing a set of time series data in accordance with one or more embodiments. The system generally includes targets 102a to 102n, monitoring agents 104a to 104n, analytic services 106, and data store 118. Targets 102a, 102b, and 102n represent a plurality of target resources that have been deployed within one or more datacenters, clouds, and/or other computing environments. A target resource in this context may comprise any software or hardware resource. Examples may include, without limitation, processors, memory, I/O ports, network ports, storage server instances, database server instances, listeners, middleware instances, and application server instances.

Monitoring agents 104a, 104b, and 104n are responsible for gathering metric data from targets 102a, 102b, and 102n and providing the metric data to analytic services 106. Each monitoring agent may be a process, such as a daemon, that runs on the same host machine as a respective target and collects a set of one or more metrics from the respective target. For example, a monitoring agent that tracks CPU usage may periodically determine what percentage of the CPU is currently being utilized on the host machine and generate a sample value that identifies the utilization rate. The monitoring agent may periodically provide the sample metric values to analytic services 106.

A metric may refer to any data that may be measured periodically and represented as a time series. Examples of metrics may include, without limitation, response times that indicate how long a target resource takes to respond to a request, wait times that indicate how long a target resource is waiting on a request, request counts that indicate how many requests have been received and/or sent to/from a target resource, session counts that indicate how many sessions are active within a database or other software resource, logon counts that track the number of logons, error message counts that track the number of logged error messages, memory bandwidth metrics that indicate how much memory is free, and/or other utilization metrics that are indicative of the utilization rate of a respective target resource.

In the context of software resources, monitoring agents 104a to 104n may track performance metrics across a plurality of tiers in a multi-tiered (or multi-layered) application. For instance, a three-tier application often includes a presentation tier for interfacing with a user, a domain logic tier that processes commands received from the presentation tier using application-specific logic, and a database tier that controls storage and retrieval of information from a database. Monitoring agents 104a to 104n may track targets from the first, tier, second tier, third tier, or some combination thereof.

Monitoring agents 104a to 104n may reside on the same host machine as one or more services provided by analytic services 106 and/or may be communicatively coupled via a data communications network such as the Internet. If connected via a network, monitoring agents 104a to 104n may send collected metric data points over the network to analytic services 106 according to one or more communication protocols. Example communication protocols that may be used to transport data between the agents and analytic services 230 include, without limitation, the hypertext transfer protocol (HTTP), simple network management protocol (SNMP), and other communication protocols of the internet protocol (IP) suite.

Monitoring agents 104a to 104n may also collect topology metadata. Topology metadata may comprise any information that describes dependencies and/or other relationships between different target resources. In one or more embodiments, the topology metadata defines functional dependencies between target resources, where a first resource is "functionally dependent" on second resource if failure of the second resource may cause the first resource to stop functioning properly or otherwise significantly impact the performance of the first resource. For instance, a database application may be functionally dependent on a physical database archive. If the database archive fails, the database application may not be able to continue processing transactions until the issue is resolved.

The topology metadata may be used to construct a topology graph that represents an overall architecture, arrangement, setting, and/or usage of nodes of a target system. The topology graph may comprise a plurality of nodes, representing different target resources, and edges (or connections between nodes), where each edge indicates that two connected nodes have a relationship with each other. As an example, a target system may include a server that implements multiple applications. A topology graph for the target system would indicate that the server is "connected to" each of the applications. If one node is "connected to" another node in a topology graph, then the two nodes are determined to be functionally associated with each other. There may be multiple levels of dependency defined along a dependency chain in a topology graph. For instance, target resource A may depend on target resources B, which depends on target resource C, etc. Target resource A may thus be considered to have a dependency relationship with target resource C and any other target resources along the dependency chain.

In one or more embodiments, the topology metadata is created independently from the metric data. As previously indicated, the topology metadata tracks relationship information between target resources, while metric data may capture performance metrics. The performance metrics that are captured may be independent of any relationship information for the corresponding target resource. For example, the database transaction response time may be tracked independent of what physical storage unit the database transaction depends on. If the topology is changed, then the metrics may still be tracked without interruption. The topology metadata may be manually provided by an administrator and/or automatically discovered. A process may automatically discover topology information based on configuration, setup, and/or installation files that indicate the presence and/or absence of certain software functionality.

Analytic services 106 includes logic for monitoring and analyzing metric data extracted from targets 102a to 102n. Analytic services generally comprises collection logic 108, training logic 110, evaluation logic 112, and control console 114. The term "logic" as used herein includes computer or electrical hardware component(s), firmware, a non-transitory computer readable medium that stores instructions, and/or combinations of these components configured to perform one or more functions or actions, and/or to cause one or more functions or actions from another logic, method, and/or system. Logic may include a microprocessor controlled by executable code, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logic units are described, it may be possible to incorporate the multiple logic units into one physical logic component. Similarly, where a single logic unit is described, it may be possible to distribute the single logic unit between multiple physical logic components.

Data store 118 comprises volatile and/or non-volatile storage that is accessible to analytic services 106. For example, data store 118 may comprise memory, disk, solid-state drives, flash, and/or other storage devices. Data store 118 may reside on the same host machine as one or more of analytic services 106 or may reside on a separate storage server that is accessible via a data communications network such as the Internet, depending on the particular implementation. In one or more embodiments, data store 118 stores the following data: metrics. Data store 118 stores a variety of data including metrics 120, predictive models 122, correlation time-series 124, change classifiers 126, analytic results 128 and settings 130.

Collection logic 108 receives metric data from monitoring agents 104a to 104n and stores the metric data within data store 118. In one embodiment, collection logic 108 builds a time-series for each metric that is received. A time series may be built by storing sample values in a sequential order based on time. Collection logic 108 may store timestamps for each value that is received, where a timestamp indicates a logical or physical time at which the sample was captured. The timestamps may be used to align different metrics when sample values are captured at staggered times.

Training logic 110 builds a set of analytical models to facilitate identifying metrics of interest from the metrics collected by collection logic 108. In one or more embodiments, training logic 110 reads historical metrics 120 from data store 118 and uses the metric data to generate correlation time-series 124 and change classifiers 126. Training logic 110 then trains predictive models 122 based on correlation time-series 124, change classifiers 126, and/or metrics 120. Techniques for training predictive models 122 are described in further detail below.

Evaluation logic 112 uses the trained analytical models to evaluate metric data and generate a set of analytic results. For example, evaluation logic 112 may use the models to make predictions about expected correlations, compare the predictions against observed metric data as it is collected, and output alerts or other notifications if an anomaly or some other event of interest is detected. Evaluation logic 112 may be implemented as a streaming solution that evaluates metrics in real-time as sample values are collected or may be triggered by user to analyze a specified set of metric data, depending on the particular implementation.

Control console 114 provides an interface through which user 116 may interact with analytic services 106. A "user" in this context may comprise a human user such as a system administrator or a separate application. Example interfaces that may be provided through control console 114 may include, without limitation, a graphical user interface (GUI), an application programming interface (API), a command-line interface (CLI) or some other interface that allows users to invoke one or more of analytic services 106.

3. Analytic for Facilitating Root Cause Analysis

In one or more embodiments, analytic services 106 includes an analytic that facilitates diagnostics of degraded performance in applications executing within a datacenter or cloud environment. The analytic automatically determines target resources that are related, analyzes metrics for these target resources, and outputs an analytic result that identifies metrics exhibiting unusual or otherwise interesting behaviors. In the context of a database system, for instance, an administrator may be interested in diagnosing an increase in database server response time per transaction. The analytic may process hundreds or thousands of metrics associated with the database server and filter out metrics that are not statistically interesting, leaving a much smaller subset of metrics based on behavior learned from the metric data itself. The analytic allows the administrator to focus on a subset of metrics that have automatically been determined to be statistically significant, which may help reduce the amount of time spent on isolating and addressing the cause of degradation.

In order to identify behaviors that are statistically interesting, the analytic employs machine learning techniques to analyze and learn patterns in the changes and correlations amongst different metrics. The analytic then monitors the metric data to detect statistically significant abnormalities based on the learned behavior. If the abnormal behavior is classified as statistically significant, then the analytic alerts the user to bring the behavior to their attention. The criteria for classifying an abnormal behavior as statistically significant may vary from implementation to implementation. Examples are provided in further detail in the sections below.

Figure 2:
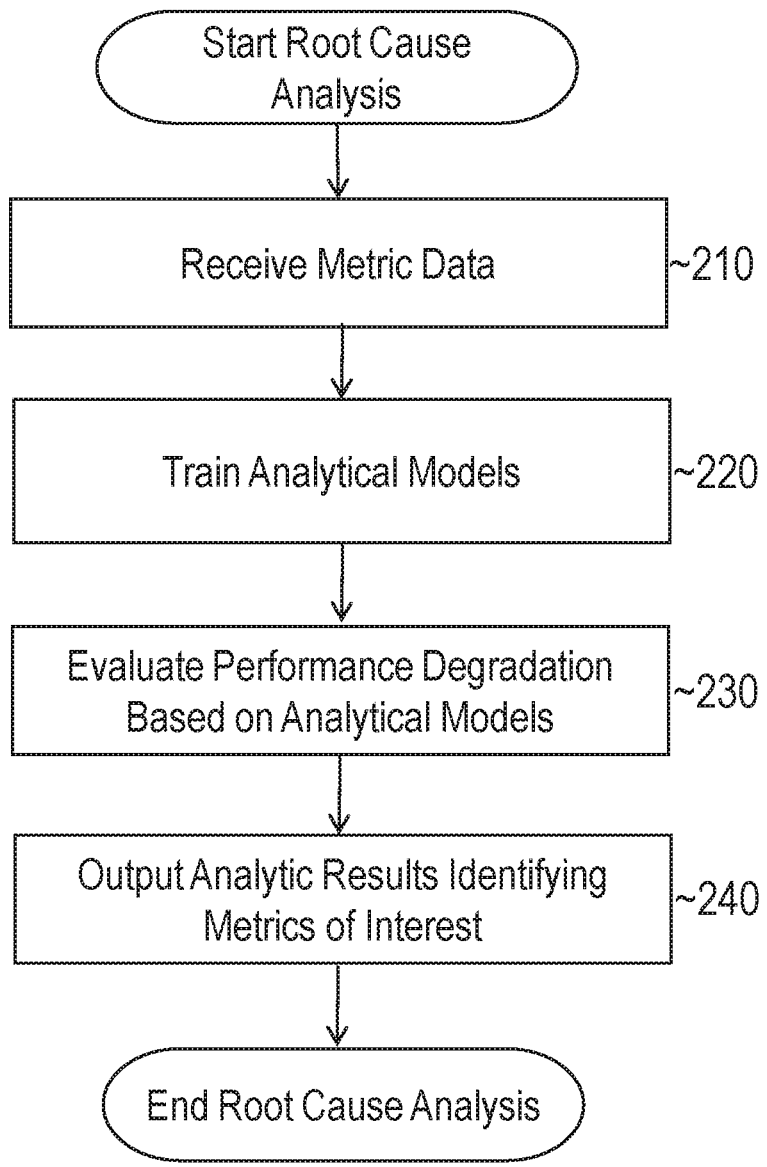
FIG. 2 illustrates an example set of operations for performing root cause analysis in accordance with one or more embodiments.

FIG. 2 illustrates an example set of operations for performing root cause analysis in accordance with one or more embodiments. At 210, the process receives a set of metric data that tracks performance metrics from a plurality of target resources. As previously described, the performance metrics may track usage patterns of different hardware and/or software resources within a software system. While different metrics may track different target resources, each metric may be directly or indirectly indicative of the overall performance of a particular software application. For instance, higher hardware resource usage may be indicative of degradation in the performance of a software system.

At 220 a set of one or more analytical models are trained based on the statistical properties associated with a set of target metrics. Example analytic models that may be trained at this step may include, without limitation, correlation prediction models, change classification models, and group analysis models. Techniques for training and applying these models are described in further detail below.

At 230, the process evaluates a set of observed metrics based on the analytical models. During the evaluation phase, the process searches for statistically significant abnormalities in the metric behavior. For instance, the process may determine whether an observed correlation is significantly different than an expected correlation and whether a change in the overall magnitude of metric values is significantly different than the expected metric values. If an abnormal behavior is detected, the associated metrics may be flagged.

At 240, the process outputs a set of analytic results identifying metrics of interest. A metric of interest in this context is a metric that exhibits a behavior that is determined to be statistically significant, increasing the likelihood that it is relevant to performance degradation within the system. The analytic results that are output may vary from implementation to implementation. Example analytic results are provided below.

4. Analytic Model Setup

An analytic may undergo separate phases including a setup phase, a training phase, and an evaluation phase. During the setup phase, discussed in the present section, a set of training and evaluation parameters (settings) are established and stored within data store 118. The parameters may guide and control various aspects of the training and evaluation phase, such as selecting which metrics to use when training the analytic models, defining relationships between different metrics, and determining when to run an evaluation. A parameter may be input by a user, allowing the injection of domain knowledge into the system, or may be automatically selected.

Figure 3:
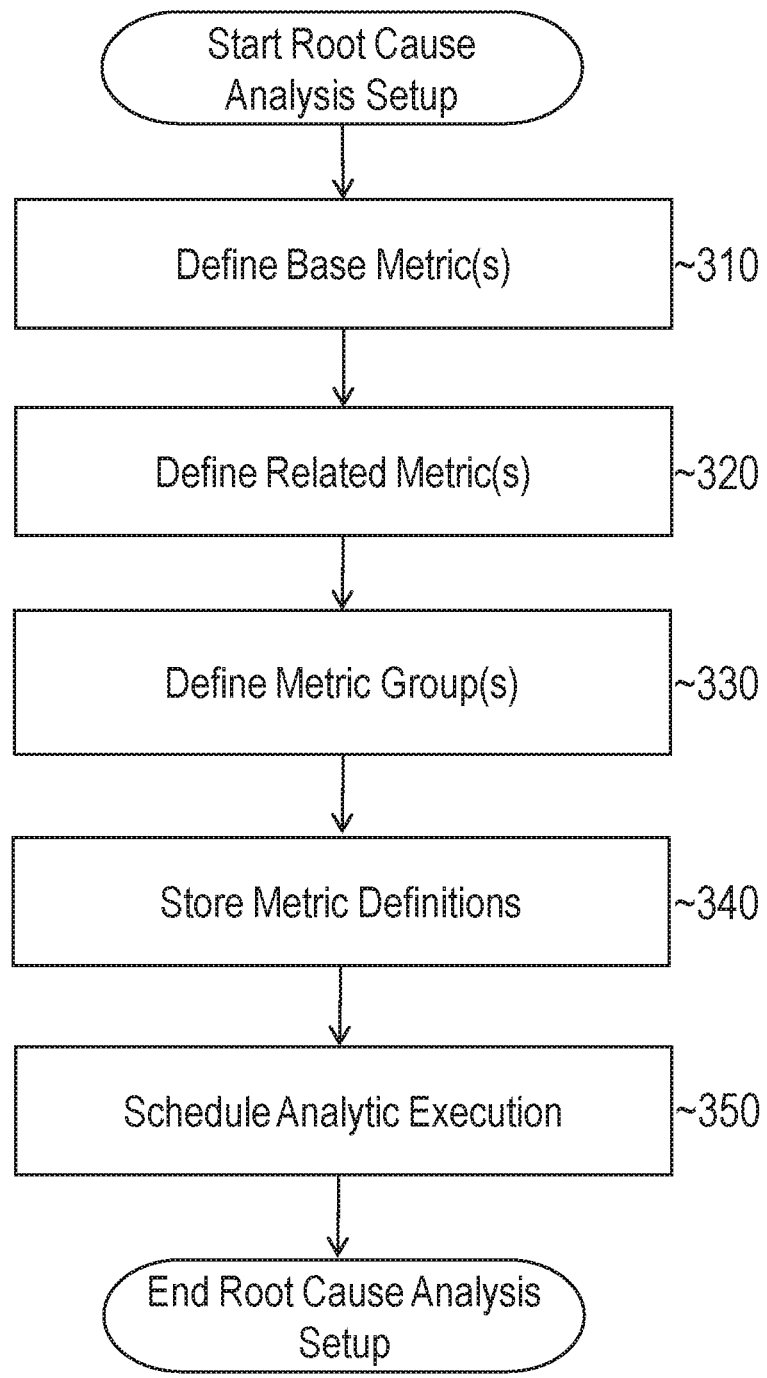
FIG. 3 illustrates an example set of operations for establishing a set of parameters for training and evaluating analytic models in accordance with one or more embodiments.

FIG. 3 illustrates an example set of operations for establishing a set of parameters for training and evaluating analytic models in accordance with one or more embodiments. At 310, one or more base metrics are defined. A "base" metric in this context refers to a metric that serves as a reference to compare against other related metrics. For instance, if response time for a particular target resource is defined as a base metric, it may be compared to other related metrics that have been established to determine what correlation, if any, exists between the response time for the particular resource and the related metric.

At 320, for each base metric, a set of one or more related metrics are defined. As indicated above, related metrics are compared to the base metrics during the training and evaluation phases. The related metrics that are selected at this step may be user-defined or automatically determined (e.g., by using a set of default values).

At 330, one or more metric groups are defined. A metric group in this context is an aggregation or decomposition of a plurality of other metrics. For instance, a metric group that tracks average user waiting time may be defined as follows: avg_users_waiting_for_{User I/O, Configuration, Scheduler, Cluster, Other, Network, . . . }. The metrics inside the brackets including "User I/O", "Configuration", etc. correspond to different metrics/resources that contribute to the average user waiting time. User-defined metric groups leverages domain knowledge to apply a group analytic, described in further detail below, which may improve filtering of metrics that are unrelated or insignificant to a particular problem. Metric groups may be selected as base metrics and/or related metrics.

At 340, the process stores the metric definitions in data store 118. These definitions may be accessed by training logic 110 and evaluation logic 112 to determine which metrics to analyze when training and evaluating the analytic.

At 350, the process schedules execution of the analytic. The analytic may be executed at a specified time, on a periodic basis, or on a continual, streaming basis. The user may also select a specific window of time to analyze as well. For instance, if the user determines degradation occurred over the course of a few hours on Monday, then the user may run the analytic on metric data collected during that timeframe. The window of time may be specified in hours, days, weeks, or any other timeframe. Alternatively, the user may prefer to analyze metric in real-time as the data is received from monitoring agents 104a to 104n. This allows the user to be notified of identified issues nearly instantaneously as degradation is occurring.

5. Analytic Model Training

Once the setup phase is complete, the next phase is to train a set of one or more analytic models. The analytic models that are trained may include, without limitation, one or more of the following:

Correlation Prediction Models: These models learn the expected correlation patterns among the base and related metrics. A flag or other alert may be generated if an observed correlation is significantly different than an expected correlation.

Change Classifier Models: These models learn expected changes in the values in the base and related metrics. A flag or other alert may be generated if an observed change is significantly different than an expected change.

Figure 4:
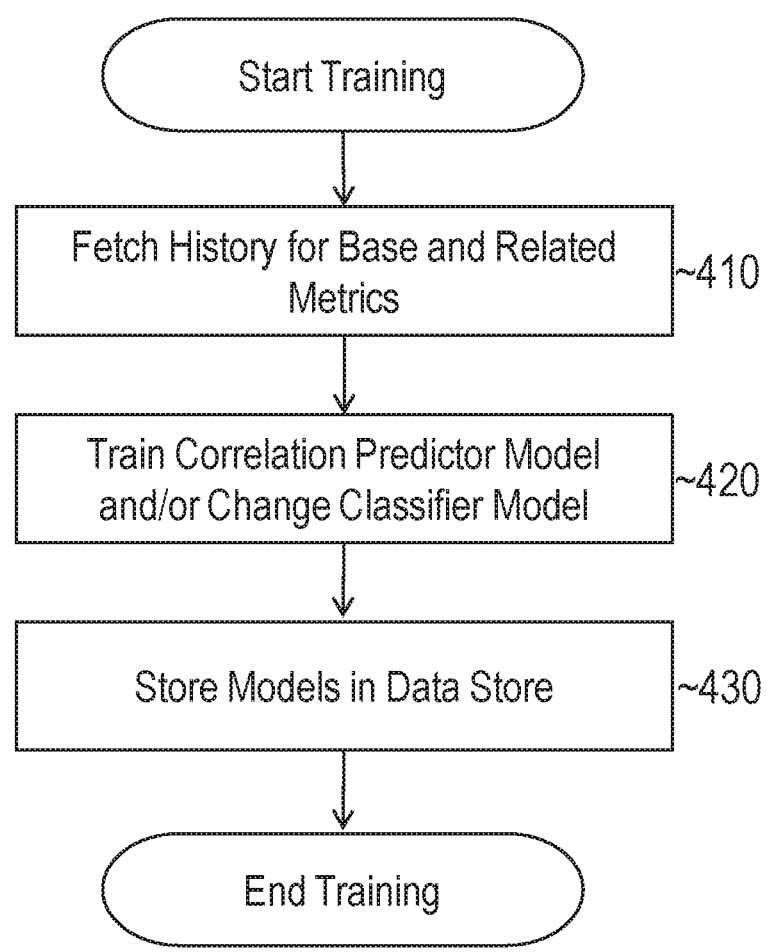
FIG. 4 illustrates an example set of operations for training a set of analytical models in accordance with one or more embodiments.

FIG. 4 illustrates an example set of operations for training a set of analytical models in accordance with one or more embodiments. At 410, training logic 110 fetches historical metric data for the base and related metrics.

At 420, training logic 110 trains a correlation prediction model and/or a change classifier model using the historical metric data for the base and related metrics. Training a correlation prediction model may involve identifying seasonal correlation patterns, correlation trends, and shifts in correlation levels. The trained correlation prediction model may be used to produce future estimates on correlation based on the historical metric data. Examples for training correlation prediction models and change classification models are provided in further detail below.

At 430, training logic 110 stores the trained model(s) in data store 118. The stored models may be used in the evaluation phase to generate a set of analytic results. For instance, metrics of interest may be identified based on the correlation predictor model, the change classifier model, the group analysis model, or some combination thereof.

In one or more embodiments, training logic 110 may update the stored models as further metric data is received. Updates may be performed on a periodic or on-demand basis, depending on the particular implementation.

6. Correlation Prediction Models

Correlation predictions models, also referred to herein as "correlation predictors", may be trained to learn the behavior of temporal variations in correlations between base and related metrics. In one or more embodiments, training logic 110 builds a correlation time-series to train a correlation prediction model, where a correlation time series includes a sequence of correlation coefficients or other values that track the correlation between a base metric and a related metric over time. The correlation time series is fit to a predictive model to determine what correlation patterns, if any, exist between the base and related metrics.

Figure 5:
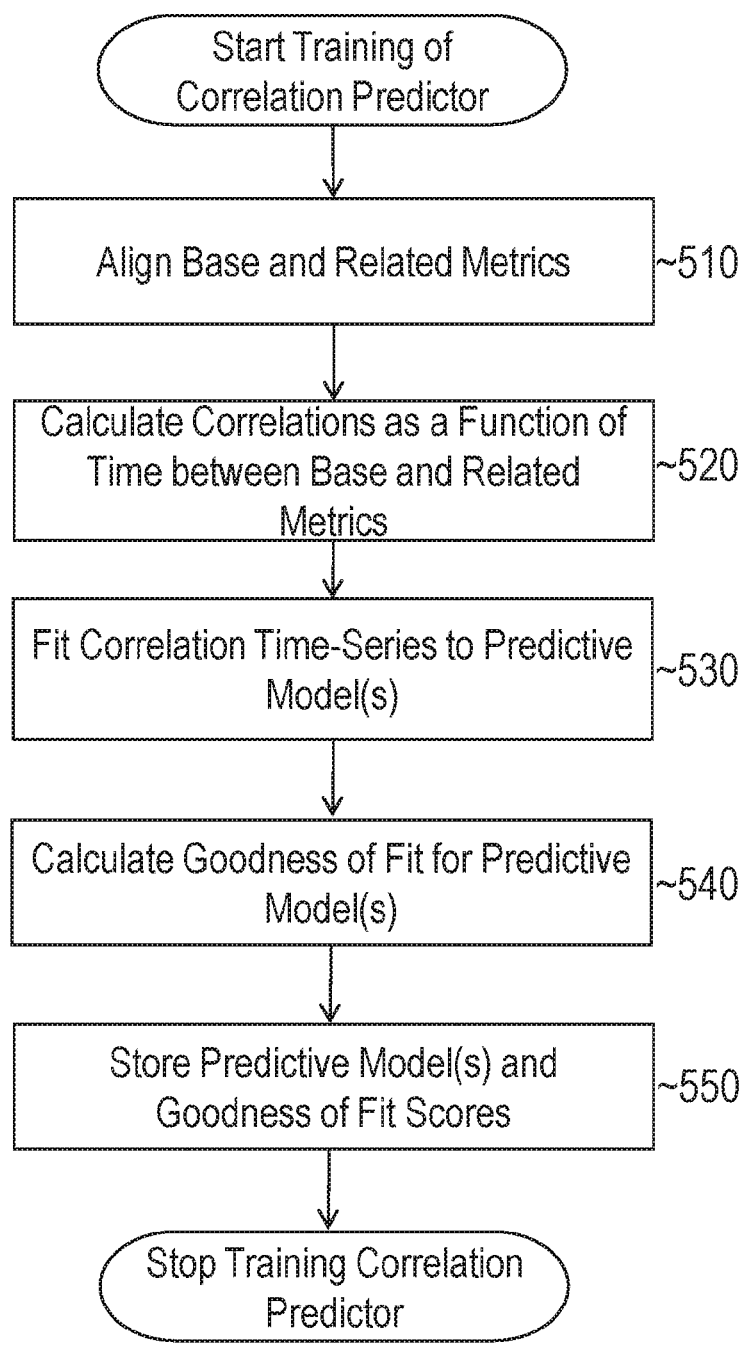
FIG. 5 illustrates an example set of operations for training a correlation prediction model in accordance with one or more embodiments.

FIG. 5 illustrates an example set of operations for training a correlation prediction model in accordance with one or more embodiments. At 510, training logic 110 aligns the base and related metrics. Training logic 110 may use a nearest neighbor technique to align the different metrics, although any time-series alignment algorithm may be used at this step. According to the nearest neighbor technique, training logic 110 examines timestamps that are associated with the sample metric values. Training logic 110 then aligns sample values that are nearest in time to each other. As an example scenario, a series of sample values tracking a first metric may be received at 9:00 a.m., 9:15 a.m., and 9:30 a.m. on Monday. A second series of sample values tracking a second metric may be received at 9:02 a.m., 9:16 a.m., and 9:33 a.m. Training logic 110 may align the 9:00 a.m. sample value from the first metric with the 9:02 a.m. sample value from the second metric, the 9:15 a.m. value with the 9:16 a.m. sample value, and the 9:30 a.m. value with the 9:33 a.m. value. Training logic 110 thus compares the timestamps of the different metric samples and aligns the samples that are closest in time to each other. In addition or as an alternative to aligning the nearest neighbor, training logic 110 may introduce a phase shift such as a "lag" to one of the metrics. A phase shift may be useful to determine whether a delayed correlation exists between two metrics. For instance, a change in one metric value may be tied to a change in the value in another metric after a threshold period of time has elapsed. Accordingly, training logic 110 may shift second metric by the threshold period of time to determine whether a delayed correlation is present.

At 520, training logic 110 calculates correlations as a function of time between the base and related metrics. In one or more embodiments, training logic 110 uses a moving window of time of a predetermined duration to compute the correlation values. For instance, training logic 110 may compare three hours of sample values collected from a first metric with three hours of sample values collected from a second metric to compute a correlation value. The window may then be shifted to compare the next three hours of data with each other until each time period in the training set has been analyzed. The duration of the window may vary depending on the particular implementation.

The correlation values that are used to build the time-series may also vary from implementation to implementation. In one or more embodiments, training logic 110 uses a sequence of Pearson product-moment correlation coefficients to build the time-series. These coefficients may be computed by dividing the covariance of the two metrics by the product of their standard deviations. The value of a Pearson correlation coefficient ranges from −1 to +1 where −1 indicates a perfect indirect (negative) correlation and +1 indicates a perfect direct linear (positive) correlation. Non-zero values within that range indicate a less than perfect correlation with correlation decreasing as the value approaches 0. A correlation coefficient of 0 indicates no correlation between the metrics. In other embodiments, other correlation coefficients, such as rank correlation coefficients, may be used.

At 530, training logic 110 fits the correlation time-series to one or more predictive models. In other word, a time-series of correlation coefficients that tracks changes in correlation over time is used as a training set of data. As an example, training logic 110 may attempt to fit the correlation time-series to an Additive and/or Multiplicative Holt-Winders forecasting model. The Additive Holt-Winters model is given by the following formulas:

$$L_t = \alpha(X_t - S_{t-p}) + (1-\alpha)(L_{t-1} + T_{t-1}) \quad (1)$$

$$T_t = \gamma(L_t - L_{t-1}) + (1-\gamma)T_{t-1} \quad (2)$$

$$S_t = \delta(X_t - L_t) + (1-\delta)S_{t-p} \quad (3)$$

where $X_t$, $L_t$, $T_t$, and $S_t$ denote the observed level, local mean level, trend, and seasonal index at time t, respectively. Parameters $\alpha$, $\gamma$, $\delta$ denote smoothing parameters for updating the mean level, trend, and seasonal index, respectively, and p denotes the duration of the seasonal pattern. The forecast is given as follows:

$$F_{t+k} = L_t + kT_t + S_{t+k-p} \quad (4)$$

where $F_{t+k}$ denotes the forecast of a correlation value at future time t+k. The Multiplicative Holt-Winters models is given by the following formulas:

$$L_t = \alpha(X_t/S_{t-p}) + (1-\alpha)(L_{t-1} + T_{t-1}) \quad (5)$$

$$T_t = \gamma(L_t - L_{t-1}) + (1-\gamma)T_{t-1} \quad (6)$$

$$S_t = \delta(X_t/L_t) + (1-\delta)S_{t-p} \quad (7)$$

where, as before, $X_t$, $L_t$, $T_t$, and $S_t$ denote the observed level, local mean level, trend, and seasonal index of the correlation time series at time t, respectively. The forecasted correlation at time t+k is then given by the following formula:

$$F_{t+k} = (L_t + kT_t)S_{t+k-p} \quad (8)$$

In addition or as an alternative to the predictive models given above, training logic 110 may attempt to fit the data to one or more other predictive models.

At 540, training logic 110 computes a goodness of fit for each predictive model to which the time-series was fit. The goodness of fit is a statistical measure that describes how well the correlation time-series fits a set of observations determined from the predictive model. Example goodness of fit measure that may be used include, without limitation, R-squared models, Pearson's chi-squared test, and the likelihood ratio test. The goodness of fit measure may be used to determine which predictive model to use, if any, when predicting future correlation values.

At 550, training logic 110 stores one or more trained predictive models and their associated goodness of fits scores in data store 118. As new metric data is collected for the base and related metrics, the correlation prediction model may be updated to learn new correlation patterns, if any, that exist between the metrics.

Figure 6:
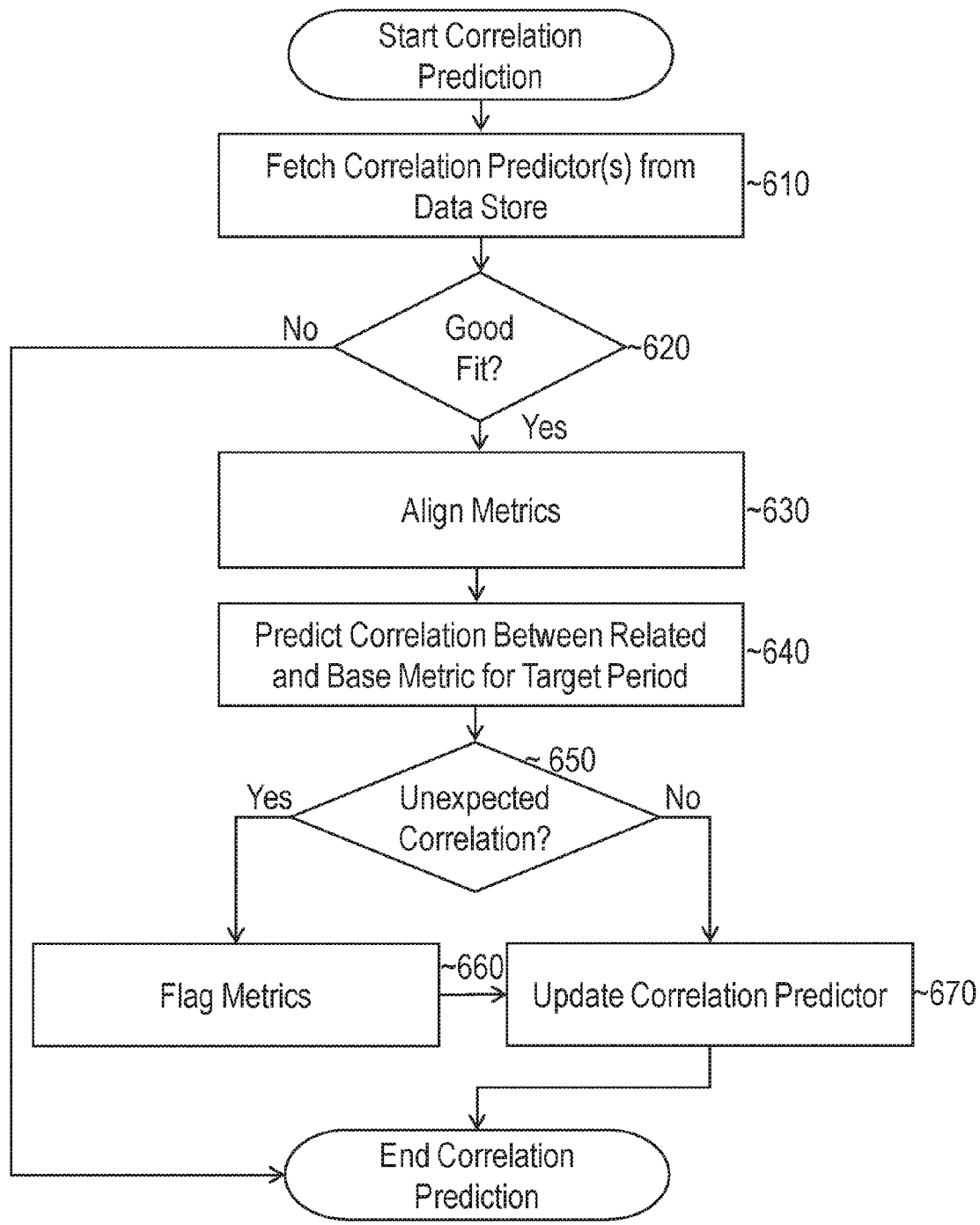
FIG. 6 illustrates an example set of operations for predicting an expected correlation between multiple metrics in accordance with one or more embodiments.

A trained correlation prediction model may be used to provide estimates of the correlation between different metrics at future times. Referring to FIG. 6, it illustrates an example set of operations for predicting an expected correlation between multiple metrics in accordance with one or more embodiments. At 610, evaluation logic 112 fetches one or more correlation prediction models from data store 118. For instance, evaluation logic 112 may fetch an Additive and/or Multiplicative Holt-Winters model that was trained using a correlation time-series tracking the correlation between a base and related metric over time.

At 620, evaluation logic 112 may determine whether the goodness of fit score exceeds a threshold. If multiple models are retrieved, then the predictive model with the best goodness of fit score may be selected and the other predictive model(s) may be discarded. If the goodness of fit score does not exceed a threshold value, then evaluation logic 112 may determine that the correlation does not follow any learnable pattern. Thus, formulating a prediction may not be useful and the process may end. If the goodness of fit score for the trained predictive model does satisfy a threshold value, then the process may continue to 630.

At 630, evaluation logic 112 aligns the metrics between a base metric and a related metric for a target period of time. The target period of time in this context refers to a timeframe for which a correlation prediction is being formulated. For instance, if predictions are being made in real-time, then evaluation logic 112 may align the sample values for the base and related metric values as they are being received. Evaluation logic 112 may use the nearest neighbor technique as previously described or any other method for aligning two different time-series.

At 640, evaluation logic 112 predicts the correlation between the related and base metric for the target period of time. The forecast may account for level changes, trends, and seasonality in the correlation data, as previously indicated. For instance, the forecast may be formulated according to equation (4) or equation (8) above using a Holt-Winters forecasting model. Alternatively, other predictive models may be used to generate the prediction based on the correlation time-series.

At 650, evaluation logic 112 determines whether the predicted correlation falls within a threshold of the observed correlation between the base and related metrics. For example, evaluation logic 112 may compute the absolute value of the difference between the predicted correlation for time t+k and the observed correlation at time t+k. If the absolute value of the difference exceeds a threshold value (e.g., 0.3), then the process may continue to 660. The threshold may vary depending on whether a high correlation or a low correlation is expected. For instance, the predicted and observed correlation may both be classified as high if within a first threshold range of "1" or "−1". The predicted and observed correlation may be classified as low if they fall anywhere outside of the first threshold range. Other thresholds may also be used, depending on the particular implementation.

At 660, evaluation logic 112 flags the metrics if the observed correlation does not satisfy the predicted correlation. In one or more embodiments, the flag is brought to the attention of an administrator or other user. In addition or alternatively, the flag may be used to perform sorting, filtering, and/or other analytics on the metric data, as discussed in further detail below.

At 670, evaluation logic 112 updates the correlation prediction model based on the observed correlation data. For example, the observed data may be fit into the prediction model to update the level, seasonal, and trend components in the Holt-Winters forecasting model. The goodness of fit score may also be updated based on the difference between the predicted and the observed correlation.

Figure 7A:
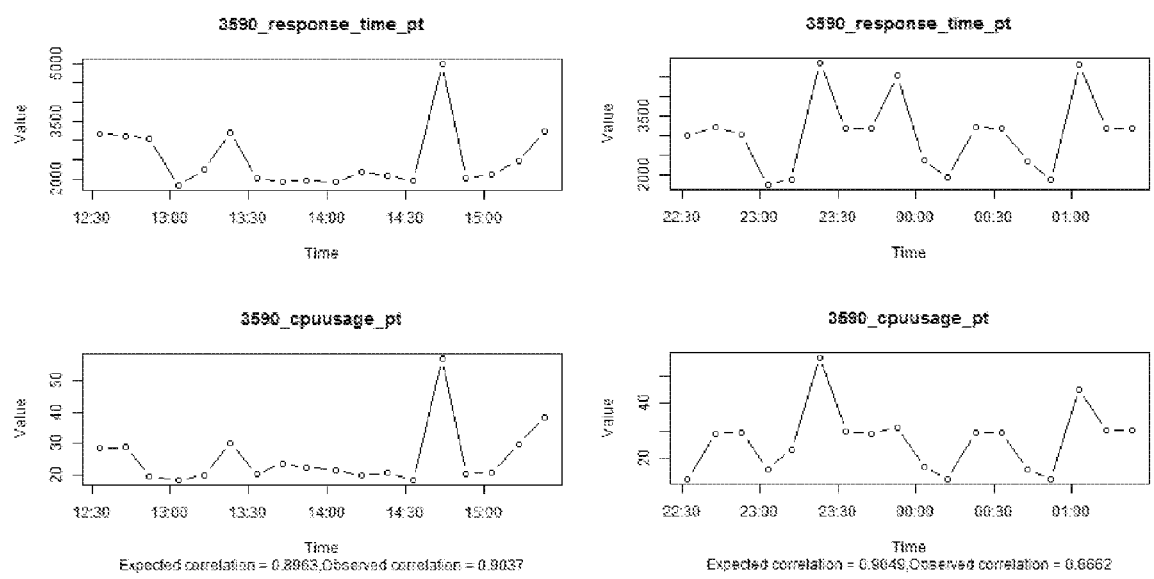
FIG. 7A illustrates a set of charts where an expected and observed correlation between different metrics is high in accordance with one or more embodiments.

FIG. 7A through FIG. 7D illustrate various charts comparing predicted (or expected) correlation against observed correlations in metrics. Referring to FIG. 7A, it illustrates scenarios in which a high correlation is expected between response time per database transactions and CPU usage, and a high correlation is observed between these two separate metrics. Although the expected correlation and the observed correlation are not an exact match, the correlation values are both relatively close to +1 indicating a high degree of correlation over the target period of time. In this scenario, the correlation prediction model does not flag the base and related metrics since the expected and observed correlation are both classified as high.

Figure 7B:
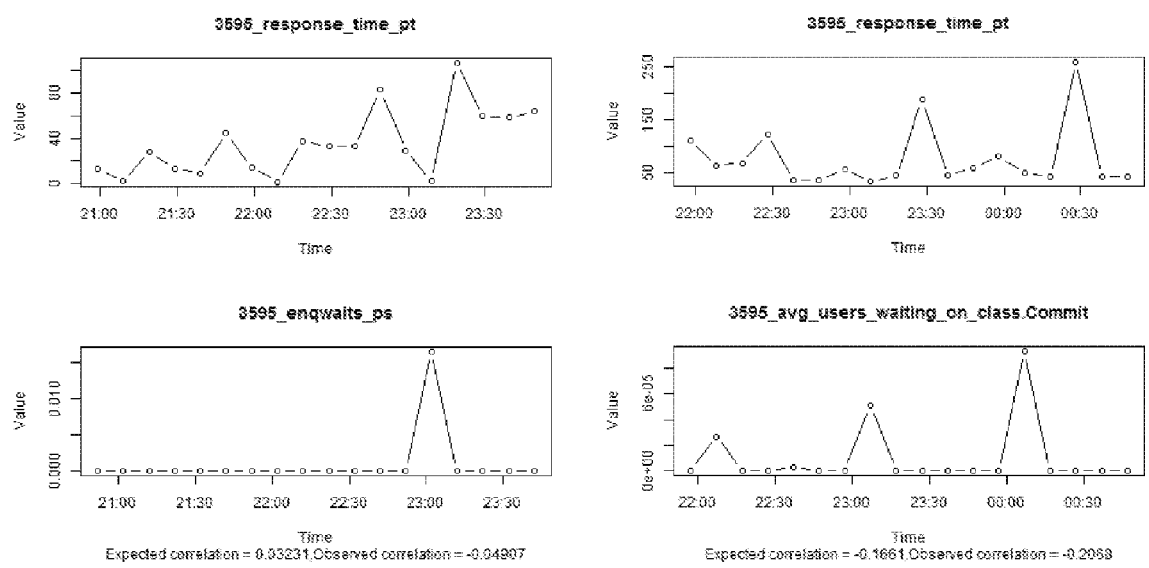
FIG. 7B illustrates a set of charts where an expected and observed correlation between different metrics is low in accordance with one or more embodiments.

FIG. 7B illustrates a set of charts where an expected and observed correlation between different metrics is low. In these charts, response time is compared against wait enqueues and an average user waiting time. Both the expected and observed correlations are close to 0 indicating little to no correlation. In this scenario, the correlation prediction model does not flag the base and related metrics since the expected and observed correlations are both classified as low.

Figure 7C:
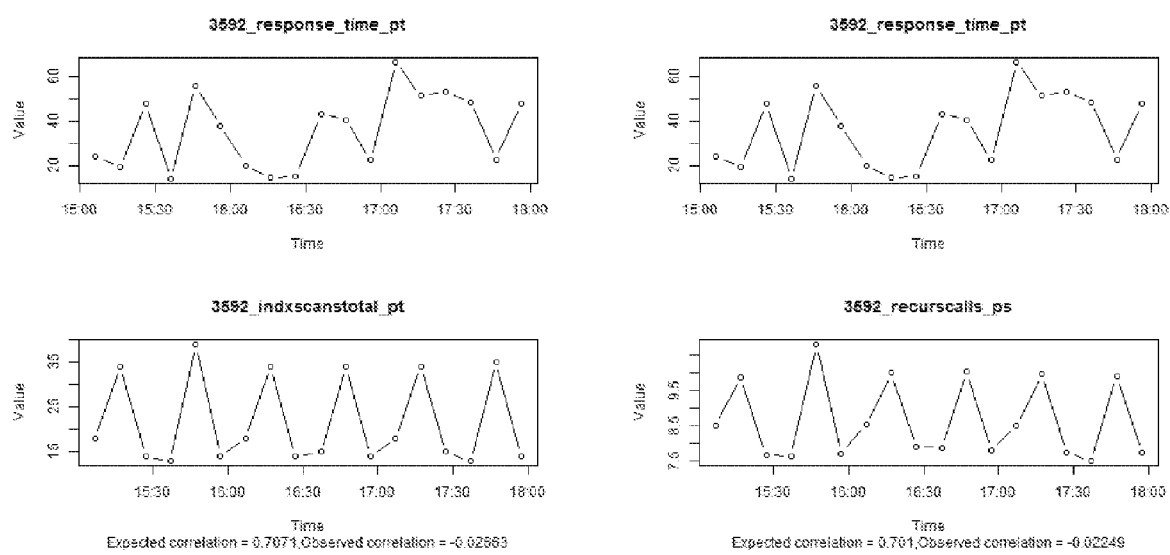
FIG. 7C illustrates a set of charts where an expected correlation between different metrics is high but the observed correlation is low in accordance with one or more embodiments.

FIG. 7C illustrates a set of charts where an expected correlation between different metrics is high but the observed correlation is low. The charts compare response times to index scans and recursive calls made within a database system. In both cases, a high positive correlation is predicted, but little or even negative correlation is observed. If such a scenario is detected, the correlation prediction model may raise a flag or other notification to alert a user. The charts may be displayed to an administrator to allow further analysis of the metric data.

Figure 7D:
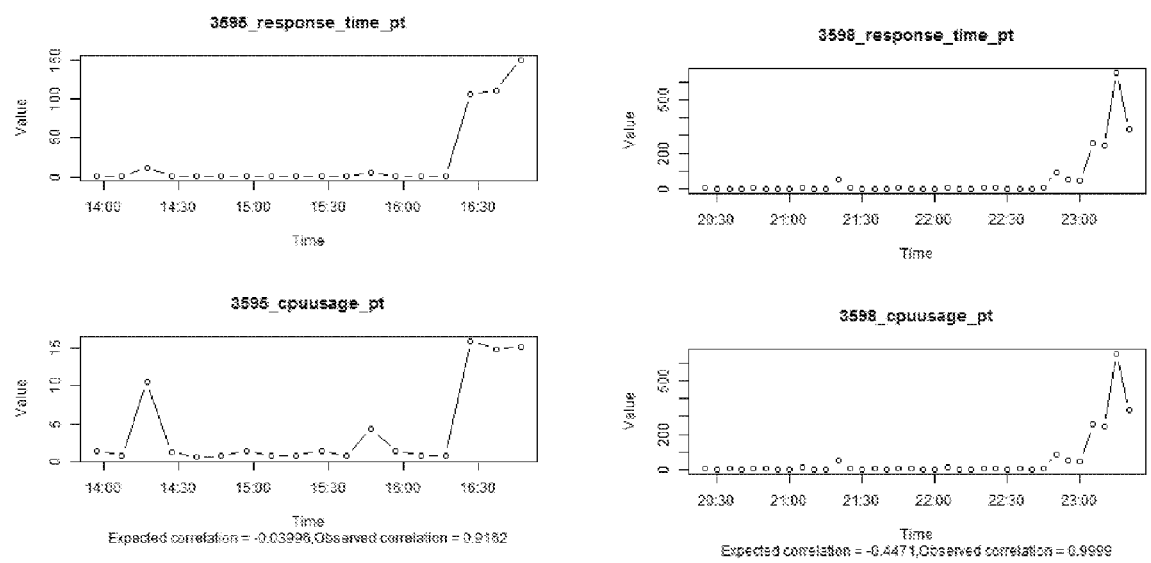
FIG. 7D illustrates a set of charts where an expected correlation between two different metrics is high but the observed correlation is low in accordance with one or more embodiments.

FIG. 7D illustrates a set of charts where an expected correlation between two different metrics is high but the observed correlation is low. The charts compare response time to CPU usage over different target periods. In both cases, a low correlation value is predicted, but a high positive correlation value is observed. As with the previous scenario, the correlation prediction model may raise a flag or other notification to alert a user. The charts may also be displayed to allow a user to gain a more detailed picture of the change in metric values that occurred over the target period of time.

In other scenarios, a correlation may predict a strong negative correlation between two different metrics, which may occur when metric values are expected to move in opposite directions. For instance, memory availability may be expected to increase as the number of active sessions in a database system decreases. If the correlation prediction model predicts a negative correlation, and little correlation or a positive correlation is detected, then a flag may be generated to notify a user. Conversely, a flag may also be generated if little correlation or a positive correlation between two metrics is expected but a negative correlation is observed. Thus, the correlation prediction model may be used to detect abnormal correlation in a variety of scenarios.

7. Change Classification Models

In addition or as an alternative to correlation predictors, the analytic may use change classification models to analyze and identify metrics of interest. A change classification model is trained to classify changes in related metrics based on the metrics respective historical data. The change classification may be useful to identify metrics exhibiting behaviors that are statistically significant. For instance, database response time typically exhibits high positive correlation with host CPU utilization. However, a change in CPU utilization from sixty percent to sixty-two percent may not be particularly interesting when diagnosing deviant response times in the database. The change classifier allows metrics that exhibit normal changes in value to be filtered out, discarded or otherwise ignored.

Figure 8:
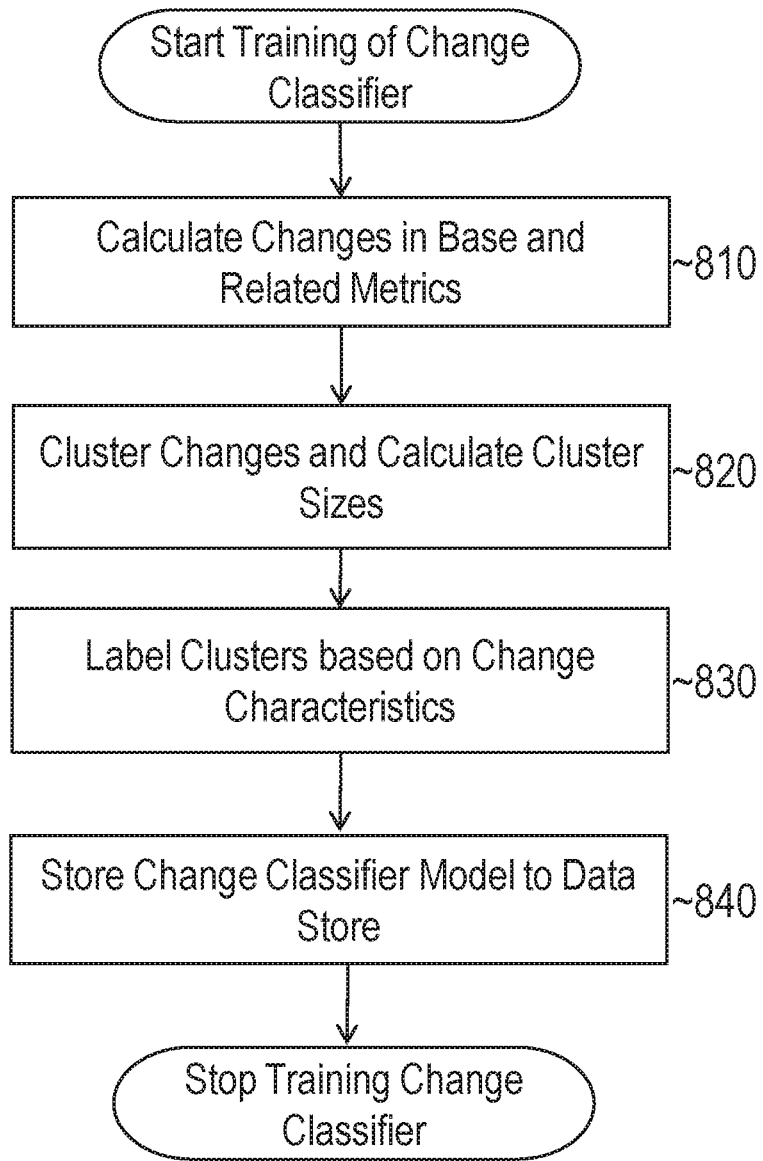
FIG. 8 illustrates a set of operations for training a change classification model in accordance with one or more embodiments.

FIG. 8 illustrates a set of operations for training a change classification model in accordance with one or more embodiments. At 810, training logic 110 calculates a set of change values for each of the base and related metrics. In order to calculate the changes, training logic may determine the absolute value of the difference between the highest metric value and the lowest metric value within a target window of time. The change value for that window may be stored, and the window subsequently shifted to the next period of time until each time period in the training set has been analyzed. The duration of the window may vary from implementation to implementation.

At 820, training logic 110 clusters the change values into a plurality of clusters and the size of each cluster is calculated. The clustering algorithm that is used at this step may vary depending on the particular implementation. In one or more embodiments, a K-means clustering algorithm is used to cluster the change values into k clusters, where k represents a positive integer greater than one. The size of the cluster may be computed by counting each change value that has been assigned to the cluster.

At 830, training logic 110 labels each respective cluster based on the change characteristics associated with the respective cluster. In one or more embodiments, each cluster is labelled as one of "normal" or "high", where "normal" represent clusters that include a threshold percentage (e.g., 95%) of the population and "high" clusters represent clusters that fall outside that range. Training logic 110 may begin with the smallest cluster center and continue labelling clusters as normal until a high cluster center is reached.

At 840, training logic 110 stores the change classifier model to data store 118. The change classifier model in this context includes the clusters and associated labels as determined during the training phase.

Figure 9:
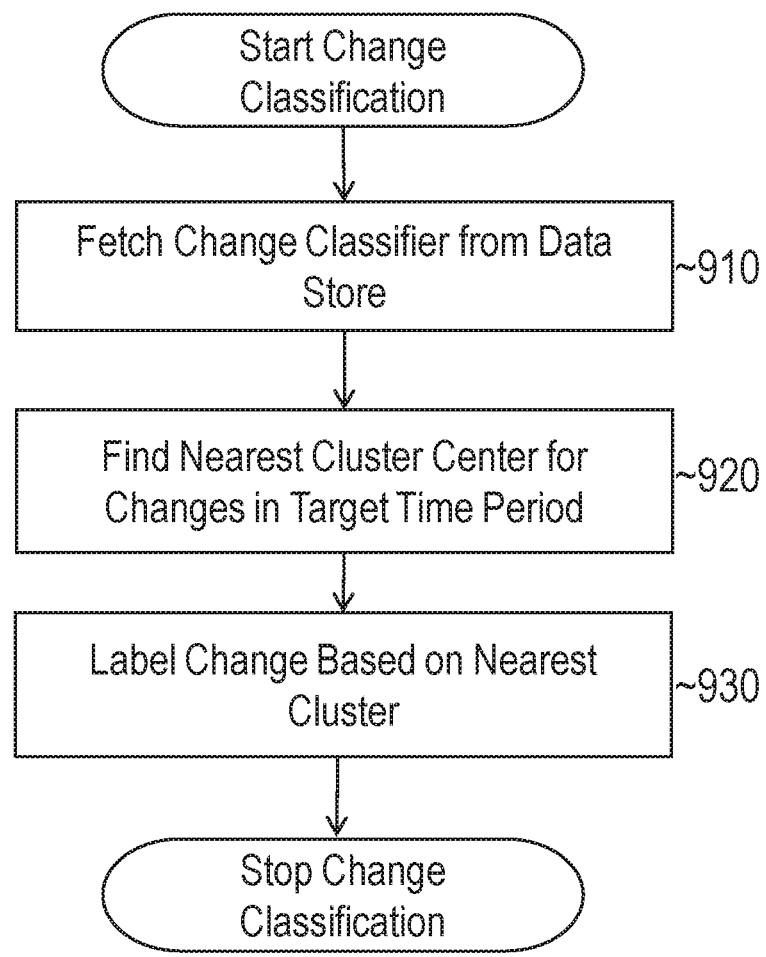
FIG. 9 illustrates a set of operations for classifying detected changes using a change classification model in accordance with one or more embodiments.

Once the change classifier has been trained, it may be used during the evaluation phase to identify abnormal changes in based and related metrics. Referring to FIG. 9, it illustrates a set of operations for classifying detected changes using a change classification model in accordance with one or more embodiments. The process may be used to evaluate observed changes for each of the base and related metrics. At 910, evaluation logic 112 fetches the change classifier models, including the clusters and their associated labels, from data store 118.

At 920, evaluation logic 112 determines the nearest cluster center for observed changes within a target time period that is being evaluated. A cluster center in this context may be computed by averaging the change values for all changes that belong to the cluster. The nearest cluster may be determined by comparing a distance (e.g., Euclidean, Jac-cardian, etc.) between the value of the change and the values of each of the cluster centers.

At 930, evaluation logic 112 applies the label of the nearest cluster center to the change being evaluated. If the cluster center belongs to a "normal" cluster, then the change being evaluated is also labelled as normal. Conversely, if the cluster center belongs to a "high" cluster, then the change being evaluated is also labelled as high. This process may be repeated for each change being evaluated. If a change is labelled as "high", then evaluation logic 112 may raise a flag or other notification to alert a user.

8. Group Analytic Models

As noted above, the user may define metric groups that are of particular interest during analysis. If any metric groups have been defined, then the analytic may analyze individual metrics that belongs to the group in the context of the entire group. The analytic may then flag metrics within the group that are outliers and/or that deviate from the expected behavior of the group.

According to one or more embodiments, evaluation logic 112 uses a group analytic model to identify one or more metrics within a group that are the most statistically significant members of the group. In order to determine whether a particular metric is statistically significant compared to other metrics in the group, the group analytic analyzes sample values from metrics that belong to the group. Based on the analysis, the group analytic determines values and changes for each individual metric relative to the entire group. The top metric or top n metrics that have the largest values and/or largest changes relative to the group may be determined to be statistically significant. The analytic may highlight these metrics when returning a set of analytic result to the user.

In order to compare relative changes and values between different metrics, group membership may be restricted such that members share the same or similar units of measurement. As an example, a group metric for wait classes may be restricted to metrics that measure wait events in terms of database time. This prevents the group analytic from computing relative changes and values in groupings where such computations may have no meaning.

Figure 10:
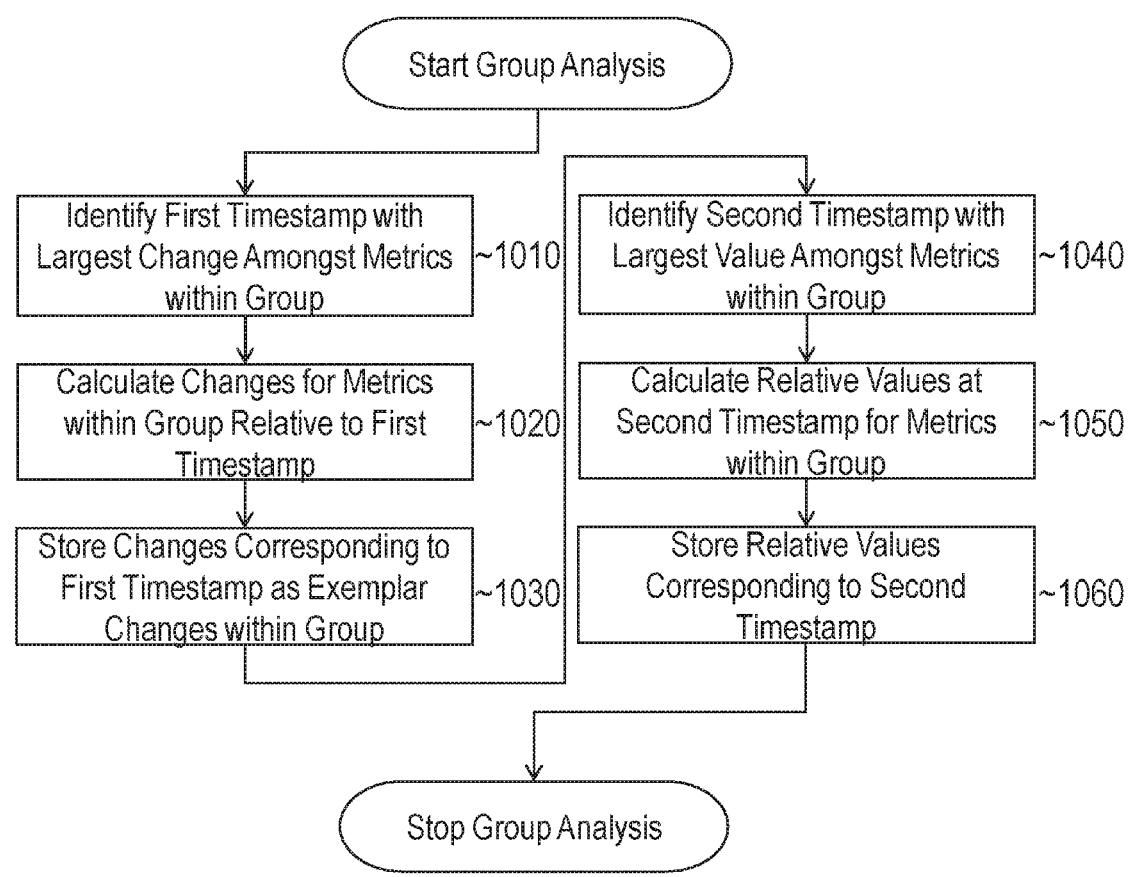
FIG. 10 illustrates a set of operations for processing sample changes and values relative to a group of metrics in accordance with one or more embodiments.

FIG. 10 illustrates a set of operations for processing sample changes and values relative to a group of metrics in accordance with one or more embodiments. Referring to the set of operations, operations 1010 to 1030 are directed toward evaluating changes relative to a group, and operations 1040 to 1060 are directed to evaluating values relative to a group. In other embodiments, operations 1010 to 1030 may be performed independent of operations 1040 to 1060 and vice versa. Furthermore, the order in which relative changes and values are processed may be reversed. Referring to the set of operations, at 1010, evaluation logic 112 processes a set of metric data from a group metric to identify a first timestamp corresponding to a time with the largest change in magnitude amongst all metrics within the group. The largest change may be determined by computing the absolute value of the difference between metric values at the first timestamp and metric values from the previous timestamp.

At 1020, evaluation logic 112 calculates for each individual metric in the group, a change value relative to the first timestamp. As indicated above, this may be computed based on the absolute value of the difference between the metric value at the first timestamp and the metric value at a previous timestamp, albeit the changes are calculated on an individual metric basis rather than a group basis. The individual change values may be compared to determine which metric within the group had the largest change and to sort metrics by the magnitude of their changes.

At 1030, evaluation logic 112 stores each of the computed change values computed for the first timestamp within data store 118. The change values represent exemplar changes within the group and may be used by the analytic to filter, sort, and/or otherwise process metrics based on which metrics have the largest changes relative to the group.

At 1040, evaluation logic 112 identifies a second timestamp that has the largest combined value for all metrics within the group. This may be determined by summing the sample values for each aligned metric in the group and identifying which combined sample has the largest magnitude. The second timestamp may correspond to the same time as the first timestamp or may correspond to a different time, depending on the characteristics of the metric data associated with the group.

At 1050, evaluation logic 112 calculates relative values at the second timestamp for each individual metric within the group. The relative value for an individual metric may be computed by dividing the sample value for that metric at the second timestamp with the sum of values for each metric in the group at the second timestamp. This approach normalizes the relative value based on the sum of all values.

At 1060, evaluation logic 112 stores, for each metric in the group, the relative values corresponding to the second timestamp. This data may be used by the analytic to filter, sort, and/or otherwise process metrics based on which metric have the largest relative values.

10. Combined Evaluations of Metric Data

Each of the analytic models described above may be individually used to analyze a set of metric data and notify a user of interesting behavior. In other embodiments, however, any combination of models may be deployed to analyze the set of metric data. One example combination may flag a metric if a metric is determined to have both statistically significant change (as determined from the change classification model) and an abnormal correlation (as determined from the correlation prediction model). Another different combination may flag the metric in either scenario or may factor in whether the metric is part of a defined group. If group metrics are defined, the analytic may also factor in which of the member metrics have the largest value and/or the largest change relative to the group.

Figure 11:
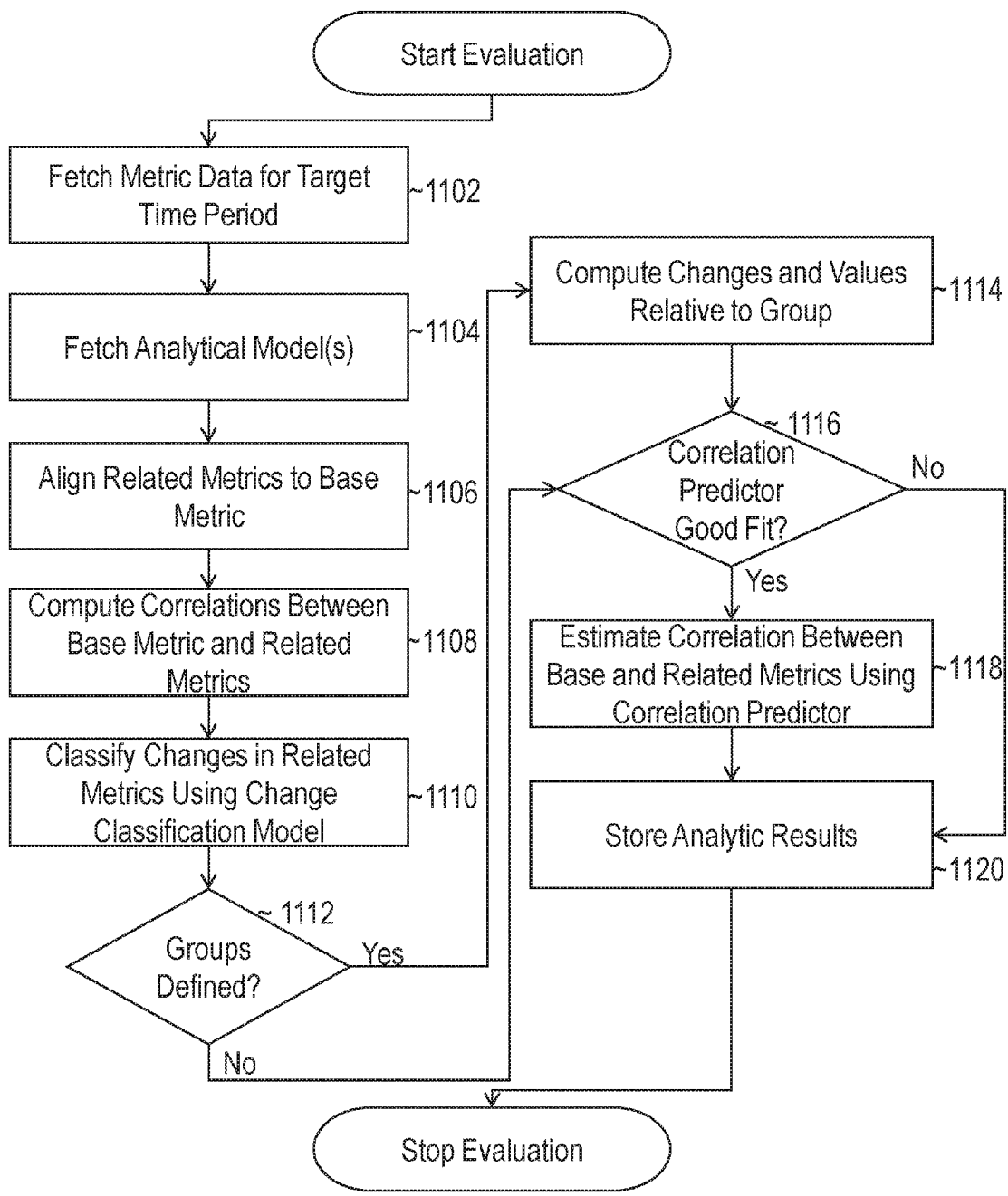
FIG. 11 illustrates a set of operations for evaluating a set of time-series data to output a set of analytic results in accordance with one or more embodiments.

FIG. 11 illustrates a set of operations for evaluating a set of time-series data using a combination of the above-described models. At 1102, evaluation logic 112 fetches metric data for a target time period that is being analyzed. The target time period may be a range covering a historical period, such as a previous period where a problem was detected, or may correspond to the most recent period of received metric data to provide real-time monitoring.

At 1104, evaluation logic 112 fetches one or more analytical models from data store 118. The analytical models may include one or more of the correlation prediction models, the change classifier models, and/or the group analysis models described above.

At 1106, evaluation logic 112 aligns the related metric to the base metric such as previously described.

At 1108, evaluation logic 112 computes correlations between the base metric and each of the related metrics for the target period of time.

At 1110, evaluation logic 112 classifies changes in the related metrics using the change classification model, if available. If not available, then evaluation logic 112 may skip this step and proceed to 1112.

At 1112, evaluation logic 112, determines whether any metric group have been defined. If one or more metric groups have been defined, then the process proceeds to 1114. Otherwise, the process skips to 1116.

At 1114, evaluation logic 112 evaluates the group analytic for each defined group. For instance, evaluation logic 112 may use the group analytic model previously described to compute the changes and values of members relative to the group.

At 1116, evaluation logic 112 determines whether a good correlation prediction model has been retrieved. For instance, evaluation logic 112 may identify which correlation prediction model (if any) has the highest goodness of fit score. Evaluation logic 112 may compare the goodness of fit score against a threshold value. If the goodness of fit score exceeds a threshold, then the process continues to 1118. Otherwise the process skips to 1120

At 1118, evaluation logic 112 estimates the correlation between the base and related metrics using the selected correlation prediction model. These estimates may be compared to the observed values computed at 1108.

At 1120, evaluation logic 112 stores the analytic results in data store 118. The analytic results may include, without limitation:

- The correlation of each related metric with respect to the base metric;
- An output of the change classification model that labels changes within the target time period;
- An output of the group analysis model that identifies changes and values relative to a group; and/or
- An output of the correlation prediction model identifying the predicted correlation of each related metric with respect to the base metric.

The analytic results generated at 1120 may be used to sort, filter, and otherwise process metrics to facilitate identification of metrics that are statistically significant. For instance, metrics may be filtered and/or sorted based on which metrics have an unexpected correlation, an unexpected change, an unexpected behavior relative to a group, or some combination thereof. An analytic output may be generated to bring these metrics to the attention of a user.

10. Topology-Aware Analytics

In one or more embodiments, the analytic may factor in topology when analyzing the set of metric data. As previously indicated, topology metadata, such as a topology graph, identifies functional dependencies and/or other relationships between target resources that are being monitored. This topology information may be useful to identify and filter metrics of interest when a failure or other event of interest is detected. For example, within a multi-level application, a dependency chain within the topology metadata may indicate that a first target resource depends on a plurality of other target resources. If a failure of the first target resource is detected, then the topology metadata may be processed to identify the target resources on which the first target resource functionally depends. The analytic may then be applied to metrics collected from the identified target resources to find the most statistically significant metrics that are likely contributing to the problem with the first target resource.

In one or more embodiments, the topology metadata may be used to select metrics to analyze. For instance, a user may be more interested in focusing on performance degradation that occurs at higher-levels within the topology, such as overall degradation in system response times. The user may select a high-level as the base metric to monitor for potential problems. In response to the selection of a base metric, the analytic may use the topology metadata to identify a set of related metrics for training and evaluating the analytical models. The related metrics may generally be selected based on which target resources functionally depend from the target resource being tracked by the base metric. As an example, if the user selects database response time as a base metric, the analytic may identify, based on the topology, the target resources that contribute to database response time such as hardware and software resources on which the database instance depends. Metrics that track these target resources may then be added as related metrics.

During the training and evaluation phases, the topology metadata may be leveraged to avoid analyzing unrelated metrics. As previously indicated, the base and related metrics may be selected based on the relationships that are identified within a topology graph. Conversely, the analytic may determine which metrics are unrelated and avoid selecting these to analyze with respect to a base metric. For instance, the correlation prediction model may be applied by generating a plurality of correlation time-series between each base metric and related metric pair as determined, based at least in part, on the topology metadata. (The set of related metrics may further be pared down based on user input/selections). The respective set of correlation time-series data is then used to train a correlation prediction model for each respective base-related metric pair. The analytic may use the topology metadata to avoid generating correlation time-series and training the correlation prediction models for pairings between the base metric and unrelated metrics. Similarly, the change classification models may be applied to base and related metrics determined from the topology metadata but not to unrelated metrics. During evaluation, the analytic may filter out metrics that are determined, based on the topology metadata, to be unrelated to the base metric being analyzed. This focuses the search for statistically significant metrics on a subset of metrics that are defined in the topology as having a relationship with the base metric. Thus, the correlation prediction models and change classification models are not trained or evaluated using unrelated metrics, which may reduce the overall computational cost of the analytic.

11. Analytic Result Processing and Visualization

The analytic results output by evaluation logic 112 may be processed to generate a visualization that highlights one or more metrics that have been identified as exhibiting a behavior that is statistically significant. A visualization in this context may comprise any display that is generated based, at least in part, on the output of the correlation prediction model, the group analysis model, and/or the change classification model. Example visualizations that may be generated may include, without limitation, reports, lists, alerts, charts, GUIs, and other images and messages.

In one or more embodiments, the analytic results that are output and displayed filter out metrics that have not been deemed statistically significant. For example, the analytic may begin with a list of metrics that are being monitored and analyzed as potential causes of a problem. Based on the outputs of the correlation prediction model, group analysis model, and/or change classification model, a subset of these metrics may be determined to be statistically significant. Those that are insignificant or irrelevant may be removed from the list. As previously indicated, filtering out metrics that are insignificant or irrelevant reduces the amount of data that needs to be processed to isolate the root cause of a problem.

In one or more embodiments, the analytic sorts a list of metrics based on the outputs of the correlation prediction model, group analysis model, and/or change classification model. Sorting may be performed to move metrics to the top of the list where the observed behavior of the metric deviates the most from the expected behavior. For instance, a metric that has changes classified as "high" by the change classification model, that has a high value relative to a group metric to which it belongs, and that deviates by a large amount from the expected correlation may be pushed toward the top of the list to bring the metric to the attention of the user. Sorting may be performed on a filtered or unfiltered list depending on the particular implementation.

Figure 12:
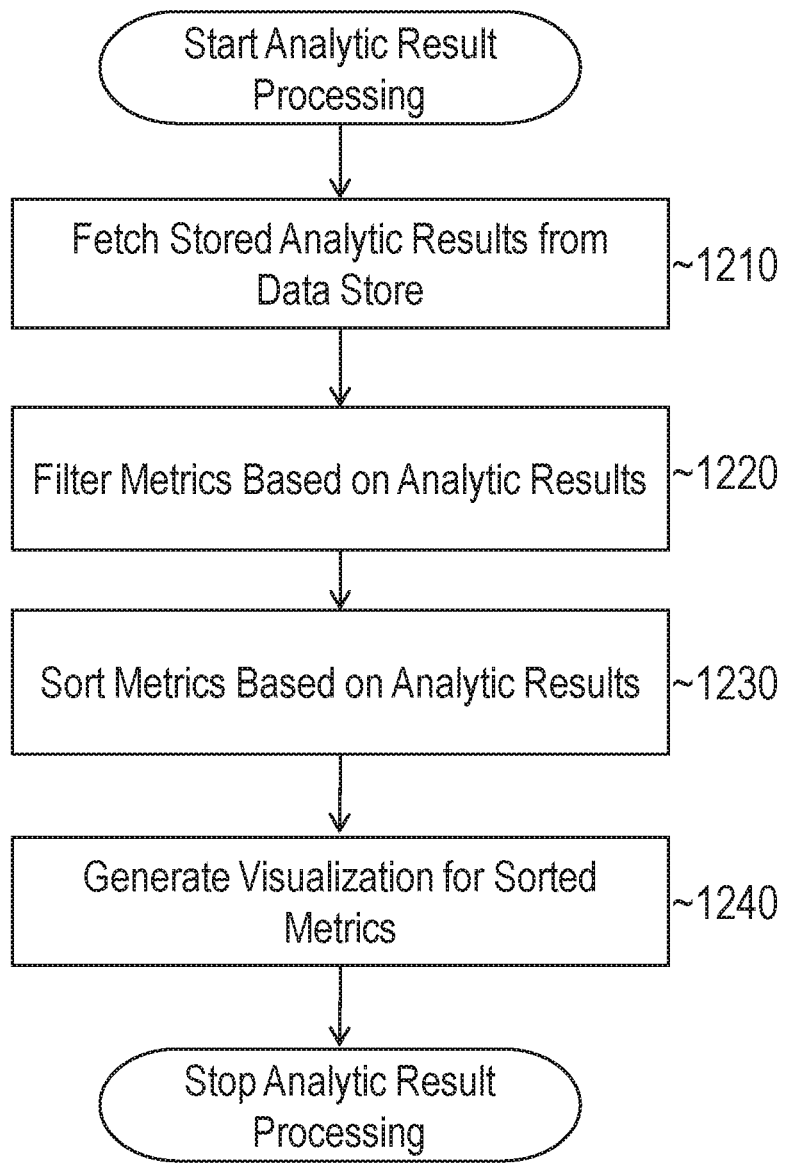
FIG. 12 illustrates a set of operations for generating a visualization representing a set of analytic results in accordance with one or more embodiments.

FIG. 12 illustrates a set of operations for generating a visualization representing a set of analytic results in accordance with one or more embodiments. At 1210, the process fetches the stored analytic results from data store 1218. The analytic results may include the observed correlations, predicted correlations, change classifications, and/or group analysis values as previously indicated.

At 1220, the process filters a list of metrics based on the analytic results. The filter criteria may vary from implementation to implementation. As an example, a related metric may be discarded if one of the following conditions is not met:

1. The absolute value of the observed correlation between the related metric and the base metric is greater than a threshold (e.g., 0.3) and the change classifier output=HIGH;
2. The absolute value of the predicted correlation is greater than a threshold value and the absolute value of the difference between the observed correlation and the predicted correlation is greater than a threshold amount;
3. The metric is part of a group and (irrespective of the observed and predicted correlations) the metric has the largest change or the largest value within the group.

At 1230, the metrics on the list are sorted based on analytic results. The sorting criteria that are used at this step may vary depending on the particular implementation. In one or more embodiments, metrics are sorted based on their observed correlation with respect to the base metric. The metrics with the highest correlations may be ranked or placed above metrics with lower correlations. This allows the related metrics that are most correlated to the base metric to be highlighted first in the list. In another embodiment, the related metric may be sorted based on the difference between the observed correlation and the predicted correlation. This allows metrics that deviate the most from expected correlation patterns to be highlighted first in the list.

At 1240, the process generates and displays a visualization for the sorted metrics. In one or more embodiments, the visualization charts the metrics in an order that they appear on the list. The visualization may include charts for each metric on the sorted list or a subset thereof. The visualization may allow the user to drill down on individual metrics and/or metric groups to obtain more detailed information about each metric. The visualization may also include annotations based on the analytic result to help identify possible root causes of a detected problem.

FIG. 13A through FIG. 13D depict various visualization analyzing the response time per database transactions measured within different database systems. A problem in this context may be defined as the occurrence of three consecutive high response times per transaction measurements. The response time serves as the base metric in these scenarios, and the related metrics are process from the following metric groups:

instance_throughput—includes metrics that indicate a throughput associated with a particular database instance such as the number of average active sessions and the average database server response time;

sga_pool_wastage—includes metrics indicating efficiency in memory utilization within a shared memory area allocated for a particular database instance;

wait_sess_cls—includes metrics measuring different wait events within the database system;

archFull—includes metrics measuring the utilization rate of a storage archive;

instance_efficiency—includes metrics measuring the efficiency of a particular database instance such as the CPU usage associated with the database instance and the number of cache misses associated with the database instance;

system_response_time_per_call—includes metrics measuring response times within the database system such as how long calls to different resource take before being processed.

database_resource_usage—includes metrics measuring database resource utilization rates of various database server resources;

wait_bottlenecks—includes metrics measuring waiting times for identified bottlenecks;

sql_response—includes metrics measuring the efficiency of processing standard query language statements by the database system.

Figure 13A:
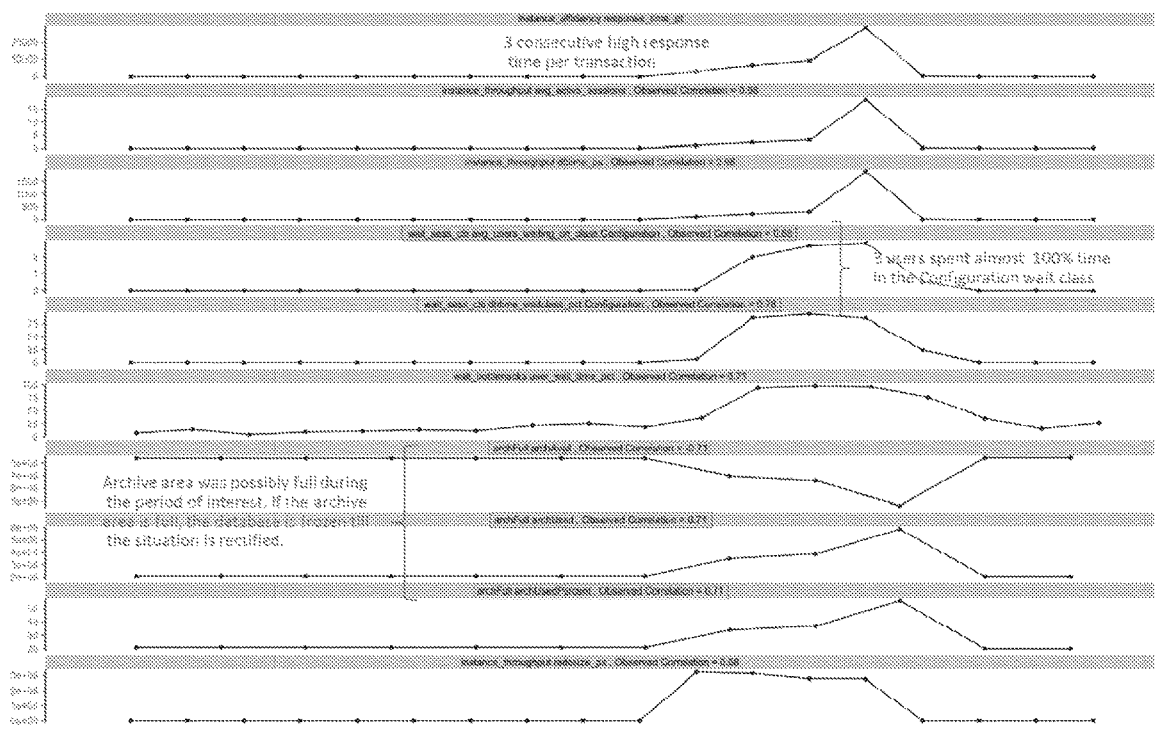
FIG. 13A illustrates an example visualization in accordance with one or more embodiments.

FIG. 13A illustrates an example visualization that displays a set of metrics filtered and sorted based on correlation and the output of the change classifier. The visualization helps identify the root cause of three consecutive high response times per transaction as illustrated in the chart for the base metric. The related metrics indicate that three users spent almost one hundred percent of their time in a "configuration" wait class and that the archive area was likely full during the period of interest. If the archive area is full, then database operations may be frozen until the situation is rectified.

Figure 13B:
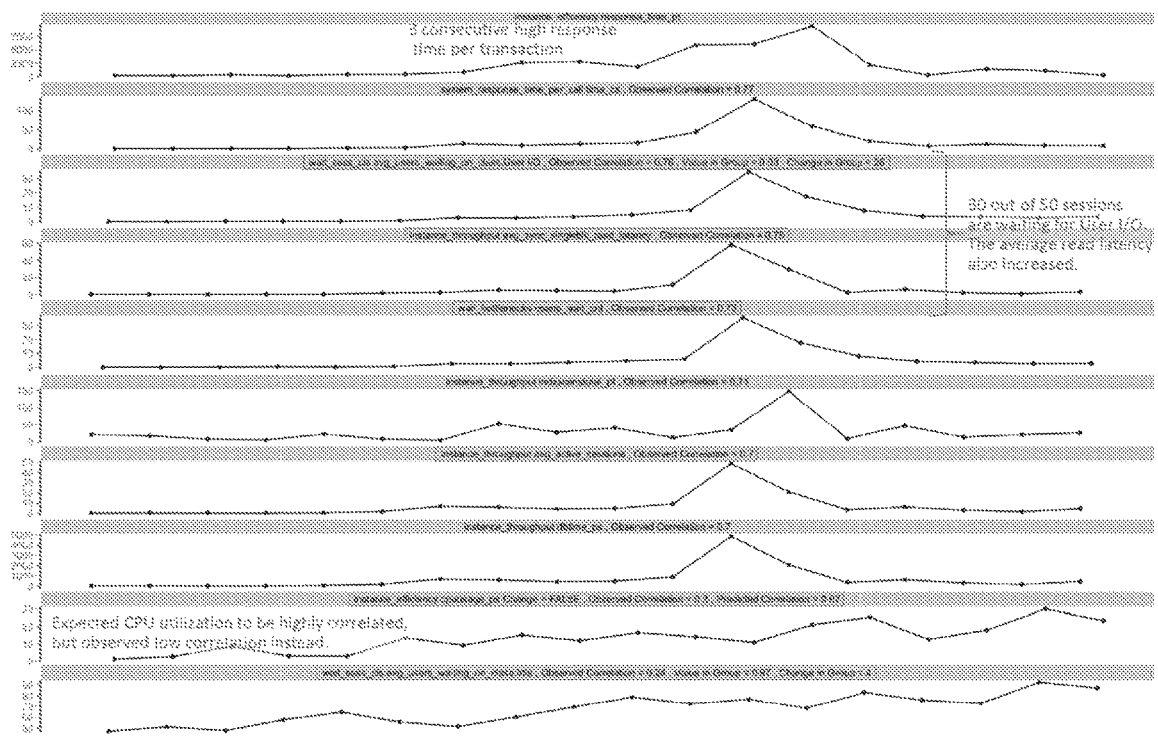
FIG. 13B illustrates an example visualization in accordance with one or more embodiments.

FIG. 13B illustrates an example visualization where the correlation predictor is used to help highlight the difference between the observed and predicted correlation between a related and base metric. Specifically, the expected CPU utilization is expected to be highly correlated to the base metric, but an observed low correlation is detected instead. Additionally, the groupings highlight that thirty out of fifty sessions are waiting for user input/output operations to complete. These metrics are presented within a list of the top ten metrics whereas other metrics that are less relevant (e.g., users waiting on concurrency, transaction commits, or other operations) are eliminated. Thus, the user has less data to sift through to identify which target resources are contributing to performance degradation.

Figure 13C:
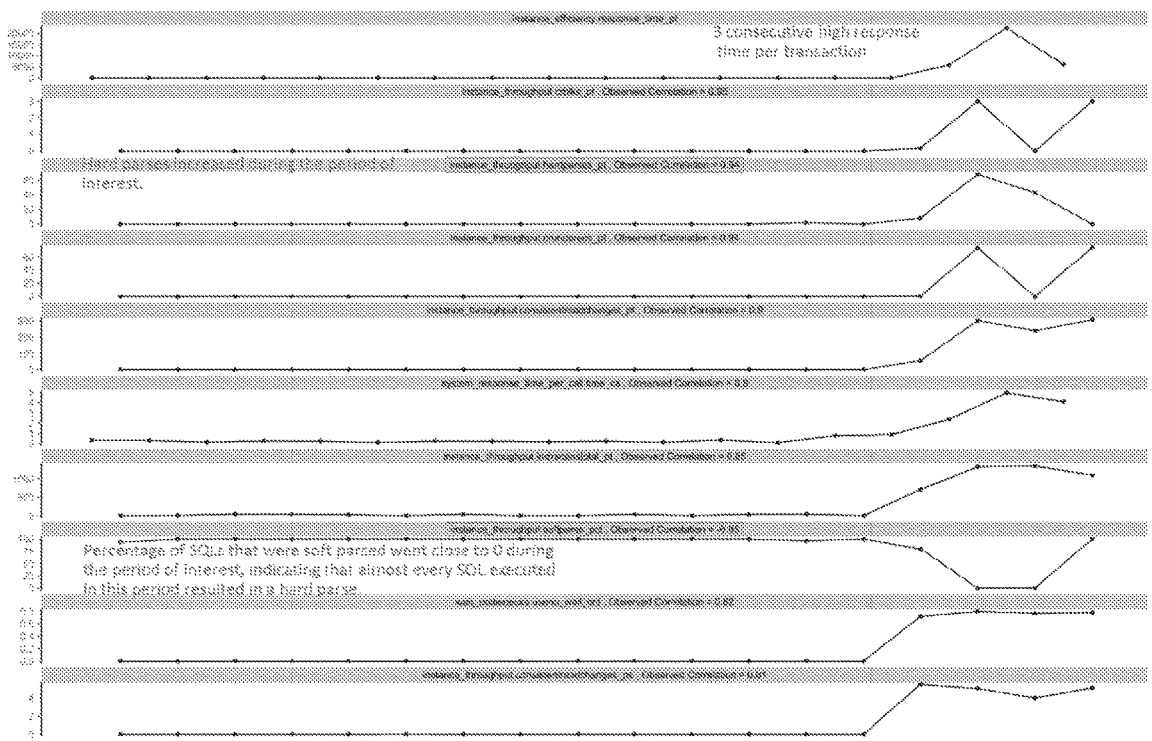
FIG. 13C illustrates an example visualization in accordance with one or more embodiments.

FIG. 13C illustrates an example visualization where correlation and change analysis help identify that most SQL statement being executed resulted in a hard parse. A "hard parse" in this context refers to a scenario in which a SQL statement is reloaded into a shared memory pool. A hard parse generally reduces performance more than a soft parse because of the overhead involved in shared memory allocation and memory management. Excessive hard parsing may occur when the shared pool size is too small or when there non-reusable SQL statements are being evaluated.

Figure 13D:
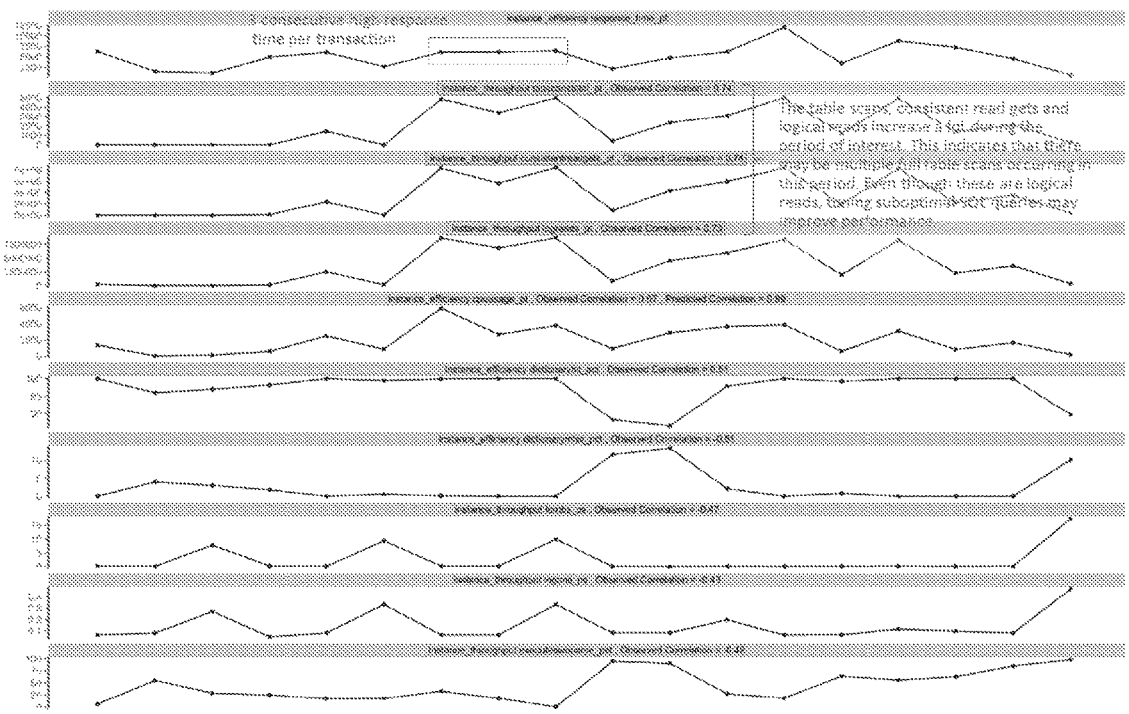
FIG. 13D illustrates an example visualization in accordance with one or more embodiments.

FIG. 13D illustrates an example visualization where correlation and change analysis helped to identify that one or more SQL statements are performing full table scan operations within the database. Even though the reads are logical reads, performance may still be improved by fine-tune the queries to avoid full table scans.

Figure 13E:
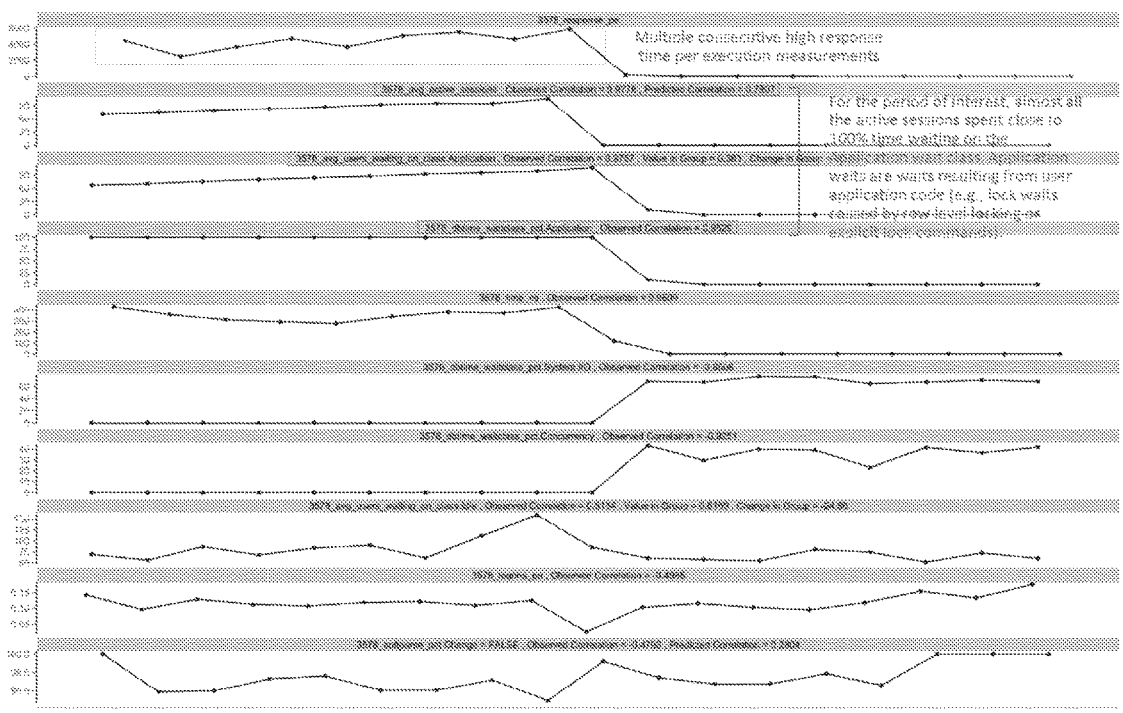
FIG. 13E illustrates an example visualization in accordance with one or more embodiments.
Figure 13F:
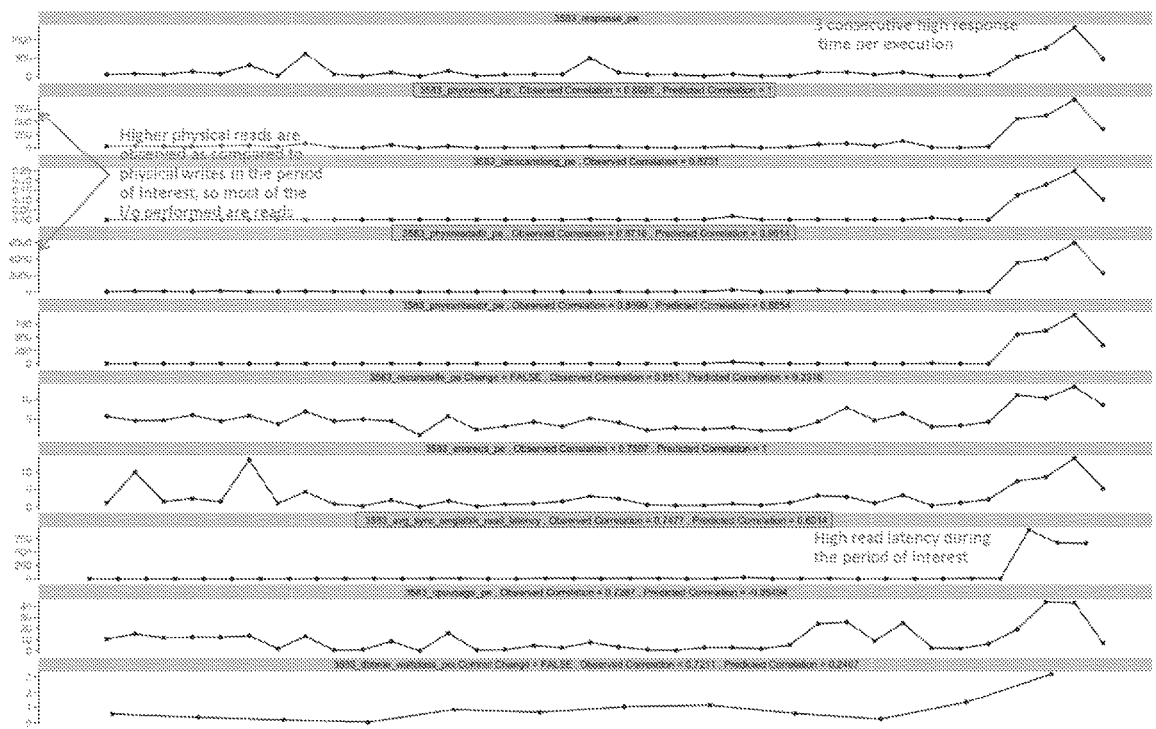
FIG. 13F illustrates an example visualization in accordance with one or more embodiments.
Figure 13G:
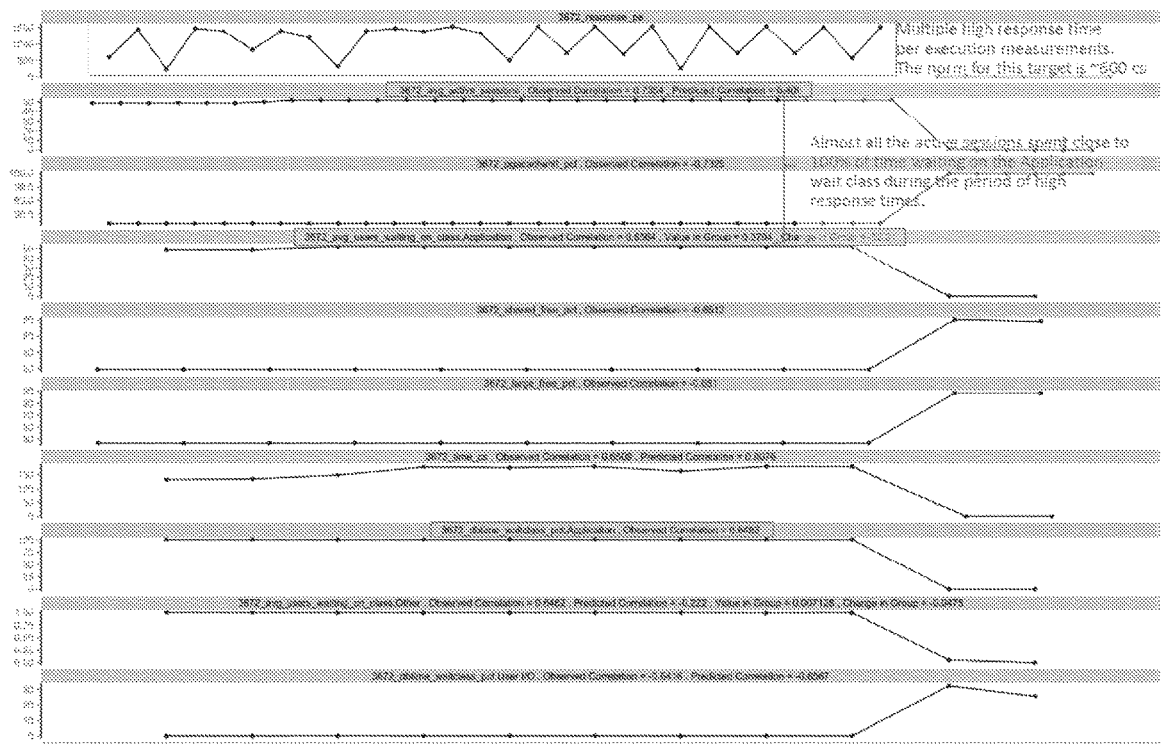
FIG. 13G illustrates an example visualization in accordance with one or more embodiments.

FIG. 13E through FIG. 13G depict various visualization analyzing the response time per execution measured within different database systems. A problem in this context may be defined as the occurrence of three consecutive high response times per execution measurements.

FIG. 13E illustrates an example visualization where the correlation analysis and domain knowledge filtering (group analysis) help identify a problem that may be in a user's application code. For the target period, almost all the active sessions spent close to one hundred percent of the time waiting on the "Application" wait class. This class represents waits resulting from user application code. A lock wait may be caused by the user application triggering row level locking or issuing explicit lock commands. This "Application" metric appears close to the top of the list due to the observed correlation and the high change value relative to other wait classes in the group.

FIG. 13F illustrates an example visualization where correlation and group analysis help identify that most of the I/O operations during the target period are reads, and the average read latency has increased significantly during the same period.

FIG. 13G illustrates an example visualization where correlation and group analysis help identify a problem that may be in the user application code. The top metrics indicate that almost all the active sessions spent close to one hundred percent of their time waiting on the "Application" wait class during the period of high response times.

The example visualizations provided above depict many different scenarios in which the correlation prediction model, the change classification model, and/or the group analysis model may be used to create displays that help identify the root causes of performance degradation. This information may be provided to a user such that they may easily spot the cause and take corrective action to cure the problem.

12. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
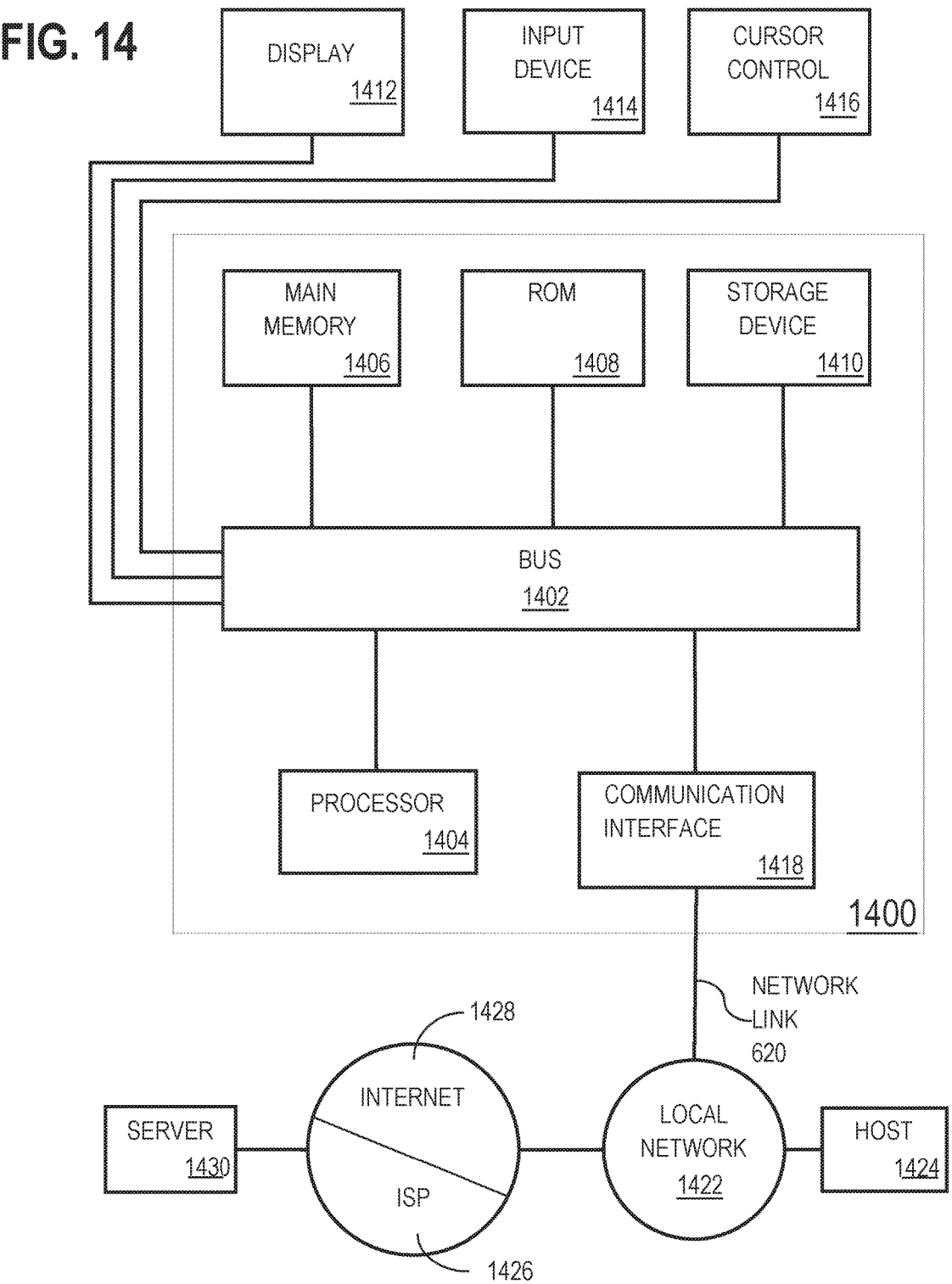
FIG. 14 illustrates a computer system upon which one or more embodiments may be implemented.

For example, FIG. 14 is a block diagram that illustrates computer system 1400 upon which one or more embodiments may be implemented. Computer system 1400 includes bus 1402 or other communication mechanism for communicating information, and hardware processor 1404 coupled with bus 1402 for processing information. Hardware processor 1404 may be, for example, a general purpose microprocessor.

Computer system 1400 also includes main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes read only memory (ROM) 1408 or other static storage device coupled to bus 1402 for storing static information and instructions for processor 1404. Storage device 1410, such as a magnetic disk or optical disk, is provided and coupled to bus 1402 for storing information and instructions.

Computer system 1400 may be coupled via bus 1402 to display 1412, such as a cathode ray tube (CRT), liquid crystal display (LCD), or light-emitting diode (LED), for displaying information to a computer user. Input device 1414, which may include physical and/or touchscreen based alphanumeric keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to host computer 1424 or to data equipment operated by Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

13. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, by at least one computing device from at least one target resource in a multi-tier system, first metric data that tracks a first metric for a first target resource in the multi-tier system and a plurality of other metric data that tracks a plurality of other metrics including a second metric for a second target resource in the multi-tier system, wherein the first target resource is functionally dependent on the second target resource in the multi-tier system;
    generating, within volatile or non-volatile storage of the at least one computing device based at least in part on the first metric data and the plurality of other metric data, a plurality of time-series of correlation values that tracks correlation between the first metric and the plurality of other metrics over time including a particular time-series of correlation values that tracks correlation between the first metric and the second metric over time;
    training, based on the time-series of correlation values, a model stored within volatile or non-volatile storage that includes a component representing at least one of a trend or a seasonal pattern within the particular time-series of correlation values between the first metric and the second metric, wherein the trend or seasonal pattern does not exist in one or more other time-series of the plurality of time-series of correlation values;
    evaluating, by the at least one computing device, the trained model stored within volatile or non-volatile storage that includes the component representing at least one of the trend or the seasonal pattern, against a set of metrics to determine that at least one of an observed or predicted correlation between the first metric and the second metric does not satisfy an expected correlation between the first metric and the second metric for a particular period of time, wherein the expected correlation between the first metric and the second metric differs between the particular period of time and one or more other periods of time;
    responsive to evaluating the model, generating and sending an alert that indicates that the second metric is contributing to performance degradation in the first metric for the particular period of time wherein contribution to performance degradation in the first metric by the second metric for the particular period of time is unexpected behavior according to the trained model.

2. The method of claim 1, wherein the first metric is a base metric;
    the method further comprising:
        determining, based at least in part on a set of topology metadata, that the first resource is functionally dependent on the second resource, wherein the first resource is in a first tier of the multi-tier system and the second resource is in a second tier of the multi-tier system;
        wherein generating the particular time-series of correlation values that track correlations between the first metric and the second metric over time is performed in response to determining that the first resource is dependent on the second resource;
        wherein the topology metadata is generated independently from the first metric data and the second metric data.

3. The method of claim 1, wherein evaluating the trained model comprises:
    generating, using the trained model, a prediction of a correlation value for the particular period of time.

4. The method of claim 1, wherein evaluating the trained model comprises:
    generating a prediction of a correlation value for the particular period of time based, at least in part, on both a learned trend and a learned seasonal pattern within the particular time-series of correlation values.

5. The method of claim 1, wherein determining that at least one of the observed or predicted correlation between the first metric and the second metric does not satisfy the expected correlation between the first metric and the second metric for the particular period of time comprises determining that a difference between the observed or predicted correlation and the expected correlation falls outside of a threshold range.

6. The method of claim 1, wherein determining that at least one of the observed or predicted correlation between the first metric and the second metric does not satisfy the expected correlation between the first metric and the second metric for the particular period of time comprises determining that a low correlation is expected and a strong positive or negative correlation is observed or predicted.

7. The method of claim 1, further comprising:
    generating a plurality of clusters that group a set of changes detected from the first metric data;
    labelling at least one cluster of the plurality of clusters as containing high changes for the first metric;
    assigning a particular change observed in the first metric data to a particular cluster from the plurality of clusters;
    determining whether to include the first metric in a list of metrics based, at least in part, on the particular cluster to which the particular change has been assigned.

8. The method of claim 1, wherein the first metric belongs to a user-defined group of metrics; the method further comprising:
    computing a value for the first metric relative to other metrics in the user-defined group; and
    determining whether to include the first metric in a list of metrics based at least in part on the value for the first metric relative to other metrics in the user-defined group.

9. The method of claim 1, wherein the first metric belongs to a user-defined group of metrics; the method further comprising:
    determining which metric in the user-defined group of metrics includes a change during the particular period of time that is largest for all metrics in the user-defined group; and
    determining whether to include the first metric in a list of metrics based at least in part on which metric in the user-defined group of metrics includes the change that is largest during the particular period of time.

10. The method of claim 1, further comprising causing display of a list of metrics that includes the first metric and the second metric.

11. The method of claim 10 wherein the first metric is a base metric and the second metric is a related metric; wherein the list of metrics includes a plurality of related metrics; the method further comprising sorting the plurality of related metrics within the list of metrics based on correlation with the base metric.

12. One or more non-transitory computer-readable media storing instructions comprising:
 instructions which, when executed by one or more hardware processors, cause receiving, by at least one computing device from at least one target resource in a multi-tier system, first metric data that tracks a first metric for a first target resource in the multi-tier system and a plurality of other metric data that tracks a plurality of other metrics including a second metric for a second target resource in the multi-tier system, wherein the first target resource is functionally dependent on the second target resource in the multi-tier system;
 instructions which, when executed by one or more hardware processors, cause generating, within volatile or non-volatile storage of the at least one computing device based at least in part on the first metric data and the plurality of other metric data, a plurality of time-series of correlation values that tracks correlation between the first metric and the plurality of other metrics over time including a particular time-series of correlation values that tracks correlation between the first metric and the second metric over time;
 instructions which, when executed by one or more hardware processors, cause training, based on the time-series of correlation values, a model stored within volatile or non-volatile storage that includes a component representing at least one of a trend or a seasonal pattern within the particular time-series of correlation values between the first metric and the second metric, wherein the trend or seasonal pattern does not exist in one or more other time-series of the plurality of time-series of correlation values;
 instructions which, when executed by one or more hardware processors, cause evaluating, by the at least one computing device, the trained model stored within volatile or non-volatile storage that includes the component representing at least one of the trend or the seasonal pattern, against a set of metrics to determine that at least one of an observed or predicted correlation between the first metric and the second metric does not satisfy an expected correlation between the first metric and the second metric for a particular period of time, wherein the expected correlation between the first metric and the second metric differs between the particular period of time and one or more other periods of time;
 instructions which, when executed by one or more hardware processors, cause responsive to evaluating the model, generating and sending an alert that indicates that the second metric is contributing to performance degradation in the first metric for the particular period of time wherein contribution to performance degradation in the first metric by the second metric for the particular period of time is unexpected behavior according to the trained model.

13. The one or more non-transitory computer-readable media of claim 12, wherein the first metric is a base metric; the instructions further comprising:
 instructions which, when executed by one or more hardware processors, cause determining, based at least in part on a set of topology metadata, that the first resource is functionally dependent on the second resource, wherein the first resource is in a first tier of the multi-tier system and the second resource is in a second tier of the multi-tier system;
 wherein generating the particular time-series of correlation values that track correlations between the first metric and the second metric over time is performed in response to determining that the first resource is dependent on the second resource;
 wherein the topology metadata is generated independently from the first metric data and the second metric data.

14. The one or more non-transitory computer-readable media of claim 12, wherein the instructions for evaluating the trained model comprise:
 instructions which, when executed by one or more hardware processors, cause generating, using the trained model, a prediction of a correlation value for the particular period of time.

15. The one or more non-transitory computer-readable media of claim 12, wherein the instructions for evaluating the trained model comprise:
 instructions which, when executed by one or more hardware processors, cause generating a prediction of a correlation value for the particular period of time based, at least in part, on the trend and the seasonal pattern within the particular time-series of correlation values.

16. The one or more non-transitory computer-readable media of claim 12, wherein determining that at least one of the observed or predicted correlation between the first metric and the second metric does not satisfy the expected correlation between the first metric and the second metric for the particular period of time comprises determining that a difference between the observed or predicted correlation and the expected correlation falls outside of a threshold range.

17. The one or more non-transitory computer-readable media of claim 12, wherein determining that at least one of the observed or predicted correlation between the first metric and the second metric does not satisfy the expected correlation between the first metric and the second metric for the particular period of time comprises determining that a low correlation is expected and a strong positive or negative correlation is observed or predicted.

18. The one or more non-transitory computer-readable media of claim 12, the instructions further comprising:
 instructions which, when executed by one or more hardware processors, cause generating a plurality of clusters that group a set of changes detected from the first metric data;
 instructions which, when executed by one or more hardware processors, cause labelling at least one cluster of the plurality of clusters as containing high changes for the first metric;
 instructions which, when executed by one or more hardware processors, cause assigning a particular change observed in the first metric data to a particular cluster from the plurality of clusters;
 instructions which, when executed by one or more hardware processors, cause determining whether to include the first metric in a list of metrics based, at least in part, on the particular cluster to which the particular change has been assigned.

19. The one or more non-transitory computer-readable media of claim 12, herein the first metric belongs to a user-defined group of metrics; the instructions further comprising:
  instructions which, when executed by one or more hardware processors, cause computing a value for the first metric relative to other metrics in the user-defined group; and
  instructions which, when executed by one or more hardware processors, cause determining whether to include the first metric in a list of metrics based at least in part on the value for the first metric relative to other metrics in the user-defined group.

20. The one or more non-transitory computer-readable media of claim 12, wherein the first metric belongs to a user-defined group of metrics; the instructions further comprising:
  instructions which, when executed by one or more hardware processors, cause determining which metric in the user-defined group of metrics includes a change during the particular period of time that is largest for all metrics in the user-defined group; and
  instructions which, when executed by one or more hardware processors, cause determining whether to include the first metric in a list of metrics based at least in part on which metric in the user-defined group of metrics includes the change that is largest during the particular period of time.

21. The one or more non-transitory computer-readable media of claim 12, the instructions further comprising instructions which, when executed by one or more hardware processors, cause displaying a list of metrics that includes the first metric and the second metric.

22. The one or more non-transitory computer-readable media of claim 21, wherein the first metric is a base metric and the second metric is a related metric; wherein the list of metrics includes a plurality of related metrics; the instructions further comprising instructions which, when executed by one or more hardware processors, cause sorting the plurality of related metrics within the list of metrics based on correlation with the base metric.

* * * * *

UNITED STATES PATENT AND TRADEMARK OFFICE
CERTIFICATE OF CORRECTION

PATENT NO. : 10,198,339 B2
APPLICATION NO. : 15/155486
DATED : February 5, 2019
INVENTOR(S) : Salunke et al.

Page 1 of 1

It is certified that error appears in the above-identified patent and that said Letters Patent is hereby corrected as shown below:

In the Specification

In Column 18, Line 17, after "1120" insert -- . --.

Signed and Sealed this
Fourth Day of February, 2020

Andrei Iancu
*Director of the United States Patent and Trademark Office*